(12) United States Patent
Nakajima

(10) Patent No.: US 8,544,966 B2
(45) Date of Patent: Oct. 1, 2013

(54) BRAKE CONTROLLER FOR VEHICLE AND BRAKE CONTROL METHOD FOR VEHICLE

(75) Inventor: Mikao Nakajima, Uji (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1062 days.

(21) Appl. No.: 12/348,861

(22) Filed: Jan. 5, 2009

(65) Prior Publication Data

US 2009/0184573 A1 Jul. 23, 2009

(30) Foreign Application Priority Data

Jan. 17, 2008 (JP) .................................. 2008-008343
Jan. 28, 2008 (JP) .................................. 2008-016495
Oct. 7, 2008 (JP) .................................. 2008-260933

(51) Int. Cl.
*B60T 8/32* (2006.01)
*B60T 8/60* (2006.01)

(52) U.S. Cl.
USPC ............................. 303/191; 303/155; 303/196

(58) Field of Classification Search
USPC .................. 303/191, 194–196, 155; 701/70, 701/78, 80
See application file for complete search history.

(56) References Cited

U.S. PATENT DOCUMENTS

| | | | | |
|---|---|---|---|---|
| 3,486,593 | A * | 12/1969 | Afanador | 188/196 P |
| 6,591,178 | B2 * | 7/2003 | Krueger et al. | 701/83 |
| 7,503,436 | B2 * | 3/2009 | Matsuura et al. | 188/1.11 E |
| 2006/0049687 | A1 | 3/2006 | Iizuka et al. | |
| 2007/0176489 | A1 | 8/2007 | Matsuura et al. | |
| 2008/0265663 | A1 * | 10/2008 | Leach et al. | 303/10 |
| 2009/0326776 | A1 * | 12/2009 | Tomlinson et al. | 701/72 |

FOREIGN PATENT DOCUMENTS

| | | |
|---|---|---|
| JP | 03-227764 A | 8/1991 |
| JP | 03-227764 A | 10/1991 |
| JP | 7-012145 A | 1/1995 |
| JP | 09-175366 A | 7/1997 |
| JP | 2001-260866 A | 9/2001 |
| JP | 2002-029405 A | 1/2002 |
| JP | 2005067245 A * | 3/2005 |
| JP | 2005-104261 A | 4/2005 |
| JP | 2006-069495 A | 3/2006 |
| JP | 2007-216944 A | 8/2007 |

OTHER PUBLICATIONS

Machine Translation of JP2005-067245A1.*
Japanese Office Action dated Apr. 24, 2012 issued in the corresponding Japanese Patent Application No. 2008-008343.
Japanese Notice of Allowance dated Dec. 18, 2012 issued in the corresponding Japanese Patent Application No. 2008-260933.

* cited by examiner

*Primary Examiner* — Anna Momper
(74) *Attorney, Agent, or Firm* — Buchanan Ingersoll & Rooney PC

(57) ABSTRACT

A brake controller for a vehicle is disclosed. The brake controller is mounted on the vehicle to control the drive of the brake device. The brake controller comprises a rough road index calculating section for calculating a rough road index in a predetermined cycle, wherein the rough road index indicates an unevenness degree of the road on which the vehicle travels; and a controlling section for controlling the drive of the brake device to provide the driving force to the brake pad when the current rough road index calculated by the rough road index calculating section is smaller than a previous rough road index calculated by the rough road index calculating section.

10 Claims, 13 Drawing Sheets

BRAKE CONTROLLER FOR VEHICLE AND BRAKE CONTROL METHOD FOR VEHICLE

CROSS-REFERENCE TO RELATED APPLICATION

This application is based upon and claims the benefit of priority from Japanese Patent Application No. 2008-008343, filed on Jan. 17, 2008, Japanese Patent Application No. 2008-016495, filed on Jan. 28, 2008, and Japanese Patent Application No. 2008-260933, filed on Oct. 7, 2008, the entire contents of which are incorporated herein by reference.

FIELD OF THE INVENTION

The present invention relates to a brake controller for vehicle and a brake control method for a vehicle to provide a braking force to one or more wheels mounted on the vehicle.

BACKGROUND

In general, a disk brake mounted on a vehicle includes a brake rotor rotating integrally with a wheel and a brake pad capable of being pressed to a sliding contact surface of the brake rotor. The brake pad moves in a direction to approach the brake rotor when hydraulic pressure in a wheel cylinder corresponding to the wheel is increased, whereas it moves in a direction to move away from the brake rotor when the hydraulic pressure in the wheel cylinder is decreased.

In the vehicle mounted with such a disk brake, when the vehicle travels or turns on a rough road having a large unevenness on the road surface, the wheel receives a reaction force from the road surface and the brake rotor may incline to the brake pad. When the inclined brake rotor contacts the brake pad, a phenomenon called as a knock back, in which the brake pad moves in a direction to move away from the brake rotor, may occur. When a driver operates a brake pedal in a state where the knock back occurs, an operation amount of the pedal is increased as compared with the case where no knock back occurs. In addition, there is a possibility that the driver may feel a sense of discomfort due to the pedal operation. To avoid the occurrence of such knock back, for example, Japanese Patent Application Laid Open No. 07-012145 discloses a brake device.

The brake device disclosed in this patent document includes a hydraulic pressure circuit for connecting a master cylinder, which generates a brake hydraulic pressure corresponding to the operation condition by the brake pedal by the driver, a wheel cylinder, and a holding valve disposed in the hydraulic pressure circuit and driven when the brake hydraulic pressure inside the wheel cylinder needs to be held. In such brake device, after the operation of the brake pedal by the driver is released, the holding valve is driven in order to hold the brake hydraulic pressure inside the wheel cylinder. Thus, even when the brake rotor inclines to the brake pad due to the rough road surface during the travel of the vehicle and the brake rotor contacts the brake pad, the brake hydraulic pressure inside the wheel cylinder is held by the driving of the holding valve. As a result, the movement of the brake pad in the direction to be away from the brake rotor is avoided.

In the brake device disclosed in Japanese Laid-Open Patent Application No. 07-12145, when the brake pedal is not operated, the holding valve continues to be driven in order to hold the brake hydraulic pressure inside the wheel cylinder. Thus, there is a problem that the total power consumption of the brake device becomes extremely large.

During travel of the vehicle, even when the brake rotor inclines to the brake pad, the brake pad does not move in the direction to be away from the brake rotor. Thus, when the vehicle travels in a state where a part of the brake rotor contacts the brake pad, both the brake rotor and the brake pad develop uneven wear. In the case where the uneven wear of the brake rotor and the brake pad grows large, there is a possibility that a vehicle body may vibrate at the time of braking the vehicle, which is called as a brake judder. Further, the driving of the brake device is preferably performed as much as economically as possible in order not to make the brake rotor inclined.

SUMMARY OF THE INVENTION

An object of the present invention is to provide a brake controller for a vehicle and a brake control method for a vehicle capable of suppressing the occurrence of uneven wear of a brake rotor and a brake pad, while suppressing the increase in the total power consumption of the brake device.

According to a first aspect of the invention, a brake controller for a vehicle is provided. The vehicle includes a brake rotor integrally rotating with a wheel, a brake pad capable of moving in a direction to approach and be away from the brake rotor, and a brake device for providing a driving force to the brake pad in order to make the brake pad approach the brake rotor. The brake controller is mounted on the vehicle to control the drive of the brake device. The brake controller includes a rough road index calculating section and a controlling section. The rough road index calculating section calculates a rough road index in a predetermined cycle. The rough road index indicates an unevenness degree of the road on which the vehicle travels. The controlling section controls the drive of the brake device to provide the driving force to the brake pad when the current rough road index calculated by the rough road index calculating section is smaller than a previous rough road index calculated by the rough road index calculating section.

According to a second aspect of the invention, a brake control method for a vehicle is provided. The vehicle includes a brake rotor integrally rotating with a wheel, a brake pad capable of moving in a direction to approach and be away from the brake rotor, and a brake device for providing a driving force to make the brake pad in order to make the brake pad approach the brake rotor. The method controls the brake device to move the brake pad in a direction to approach the brake rotor. The method includes calculating the rough road index in a predetermined cycle. The rough road index indicates an unevenness degree of the road on which the vehicle travels. The method also includes driving the brake device so that the brake pad approaches the brake rotor when the current rough road index calculated by the calculating step is smaller than a previous rough road index calculated by the calculating step.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

A first embodiment of the present invention will be described with reference to FIGS. 1 to 9. In the following description of the specification, the traveling direction of a vehicle is referred to as front. Unless otherwise stated, the left and right directions in the following description correspond to the left and right directions in the traveling direction of the vehicle.

Figure 1:
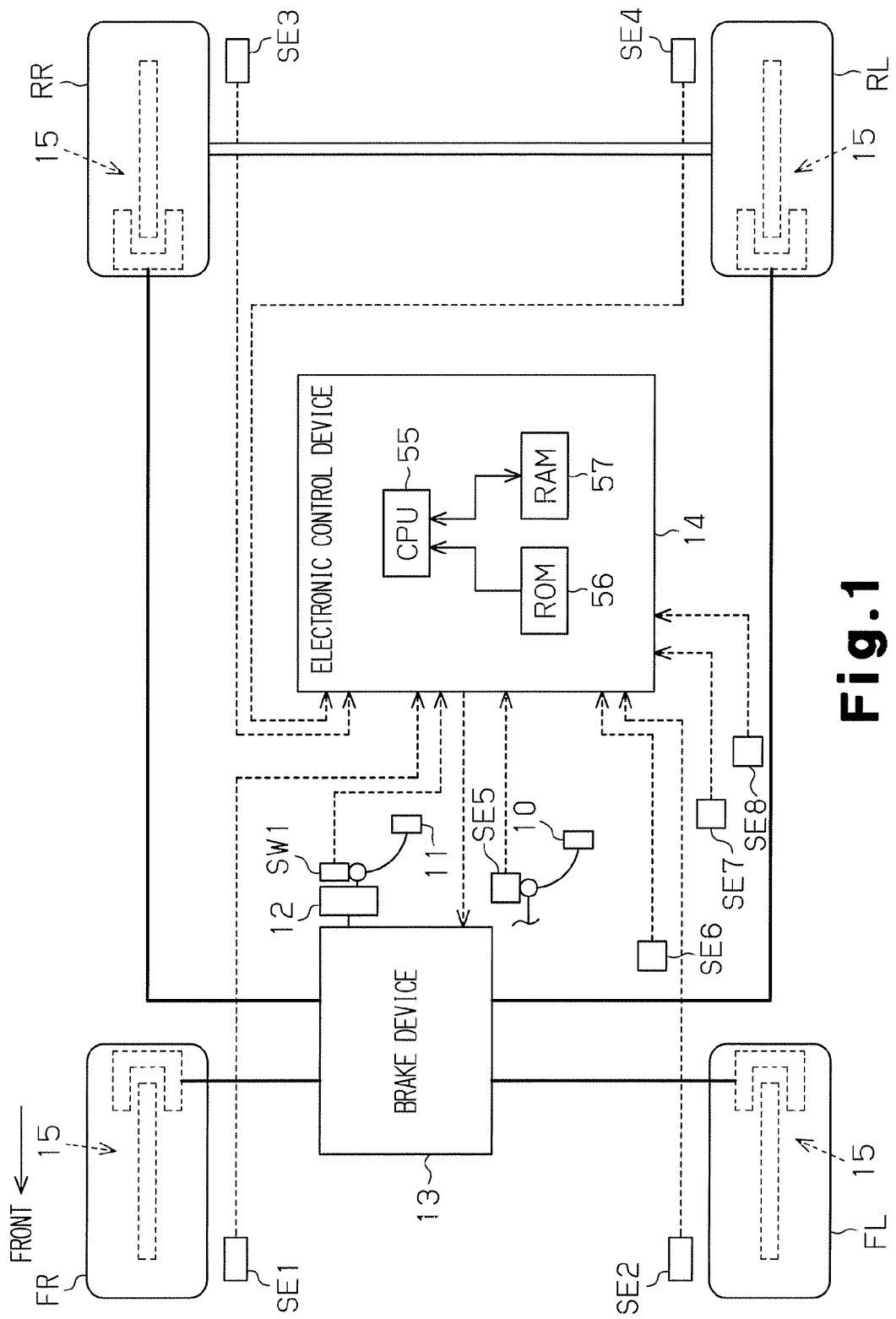
FIG. 1 is a block diagram of a vehicle mounted with a brake device according to a first embodiment.

As illustrated in FIG. 1, the vehicle of the first embodiment is an automatic four-wheel vehicle having a right front wheel FR, a left front wheel FL, a right rear wheel RR and a left rear wheel RL, and travels with a driving force based on the stepping operation of an acceleration pedal 10 by the driver transmitted to drive wheels (for example, to the rear wheels RR and RL). Such vehicle is equipped with hydraulic pressure generating device 12 for generating brake hydraulic pressure and a brake device 13 connected to the hydraulic pressure generating device 12 that provide a braking force to each wheel FL, FR, RL and RR. The brake hydraulic pressure is hydraulic pressure generated based on the stepping operation of the brake pedal 11 by the driver. The driving of the brake device 13 is controlled by an electronic control unit (hereinafter, referred to as "ECU") 14 as a brake controller. A disk brake device 15 is provided in each wheel FR, FL, RR, and RL, and gives a braking force to each wheel FR, FL, RR, and RL based on the stepping operation of the brake pedal 11 by the driver or the driving of the brake device 13.

Figure 2:
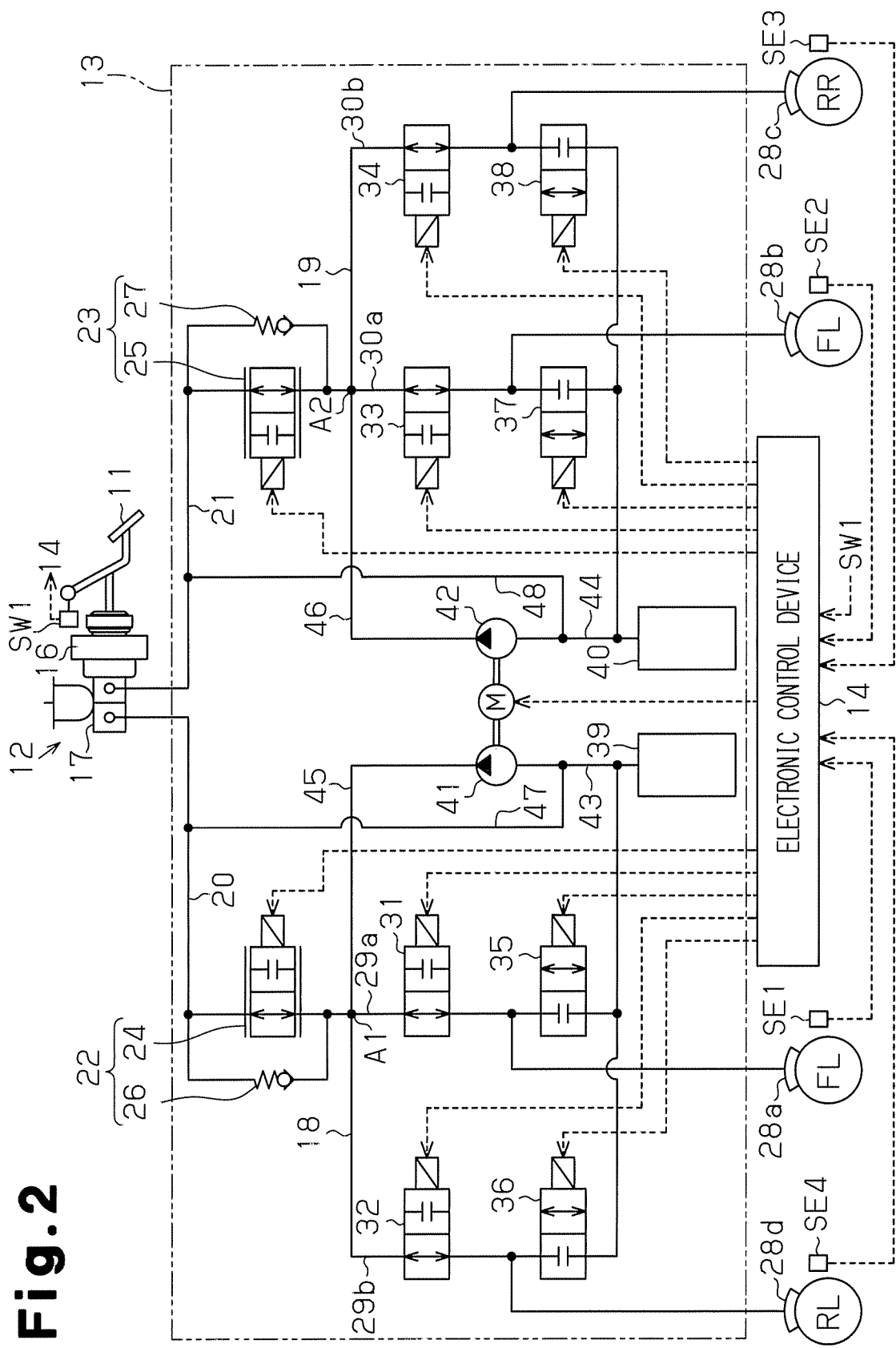
FIG. 2 is a block diagram of the brake device of FIG. 1.

First, the hydraulic pressure generating device 12 will be described with reference to FIG. 2. As illustrated in FIG. 2, the hydraulic pressure generating device 12 includes a booster 16 for doubling the stepping force of the brake pedal 11 by the driver and a master cylinder 17 for generating the brake hydraulic pressure corresponding to the stepping force doubled by the booster 16. The brake hydraulic pressure generated inside the master cylinder 17 is supplied to the brake device 13. That is, the amount of the brake fluid corresponding to the stepping amount of the brake pedal 11 by the driver is supplied to the brake device 13 from the master cylinder 17. The hydraulic pressure generating device 12 includes a brake switch SW1, and the signal corresponding to the operating status of the brake pedal 11 is output to the ECU 14 from the brake switch SW1.

The brake device 13 will be described with reference to FIGS. 1 and 2. As illustrated in FIGS. 1 and 2, the brake device 13 includes two hydraulic pressure circuits 18 and 19 connected to the master cylinder 17. Connecting flow passages 20 and 21 connect the connecting portions A1 and A2 with the master cylinder 17 and proportional differential pressure valves 22 and 23 serving as pressure-regulating mechanisms are provided in the flow passages 20 and 21, respectively. The connecting portions A1 and A2 connect the hydraulic pressure circuits 18 and 19 with supply flow passages 45 and 46, respectively. The proportional differential pressure valves 22 and 23 are formed of normally opened proportional solenoid valves 24 and 25 (referred to also as "pressure regulating valve") as a pressure loss section and relief valves 26 and 27 making a parallel relation with the proportional solenoid valves 24 and 25, respectively. Since each passage between a non-illustrated valve seat and a non-illustrated valve that forms each of the proportional solenoid valves 24 and 25 of the present embodiment forms an orifice narrower in width than the connecting flow passages 20 and 21 to generate a pressure difference between the side of the master cylinder 17 in the proportional solenoid valves 24 and 25 and the opposite side of the master cylinder 17. That is, the orifices serving as the pressure loss section are disposed at the opposite side of wheel cylinders 28a to 28d with respect to the connecting portions A1 and A2.

A wheel cylinder 28a for providing a brake force to the right front wheel FR and a wheel cylinder 28d for providing a brake force to the left rear wheel RL are connected to the first hydraulic pressure circuit 18. A wheel cylinder 28b for providing a brake force to the left front wheel FL and a wheel cylinder 28c for providing a brake force to the right rear wheel RR are connected to the second hydraulic pressure circuit 19. Depending on the change in the brake hydraulic pressure inside each wheel cylinder 28a to 28d, each disk brake device 15 is driven.

The first hydraulic pressure circuit 18 includes a channel 29a for the right front wheel FR connected to the wheel cylinder 28a, and a channel 29b for the left rear wheel RL connected to the wheel cylinder 28d. Likewise, the second hydraulic pressure circuit 19 includes a channel 30a for the left front wheel FL connected to the wheel cylinder 28b and a channel 30b for the right rear wheel RR connected to the wheel cylinder 28c. In the channels 29a, 29b, 30a, and 30b, normally opened first solenoid valves 31, 32, 33, and 34 which are driven when the increase in the brake hydraulic pressure inside the wheel cylinders 28a to 28d is regulated, and normally closed second solenoid valves 35, 36, 37, and 38 which are driven when the brake hydraulic pressure inside the wheel cylinders 28a to 28d is reduced, are provided, respectively. That is, the first solenoid valves 31, 32, 33, and 34 are holding valves whereas the second solenoid valves 35, 36, 37, and 38 are pressure reducing valves.

In the hydraulic pressure circuits 18 and 19, reservoirs 39 and 40 for temporarily storing the brake fluid flowing through the second solenoid valves 35 to 38 from inside the corresponding wheel cylinders 28a to 28d, and pumps 41 and 42 driven based on the rotation of a motor M are provided, respectively. The pumps 41 and 42 are connected not only to the reservoirs 39 and 40 through intake flow passages 43 and 44 but also to the connecting portions A1 and A2 between the first solenoid valves 31 to 34 and the proportional differential pressure valves 22 and 23 in the hydraulic pressure circuits 18 and 19 via the supply flow passages 45 and 46, respectively. Branch hydraulic pressure passages 47 and 48 are branched off from intake flow passage 43 and 44 toward the master cylinder 17, respectively. When the motor M rotates, the pumps 41 and 42 suck in the brake fluid from the reservoir 39 and 40 and the master cylinder 17 through the intake flow passages 43 and 44, and discharge the brake fluid into the supply flow passages 45 and 46.

Next, the disk brake device 15 will be described with reference to FIGS. 3A and 3B. Since the disk brake device 15 provided for each wheel FR, FL, RL, and RR has substantially the same structure with each other, only the disk brake device 15 for the left front wheel FL will be described and the description on the remaining disk brake devices 15 for the other wheels FR, RR, and RL will be omitted.

Figure 3A:
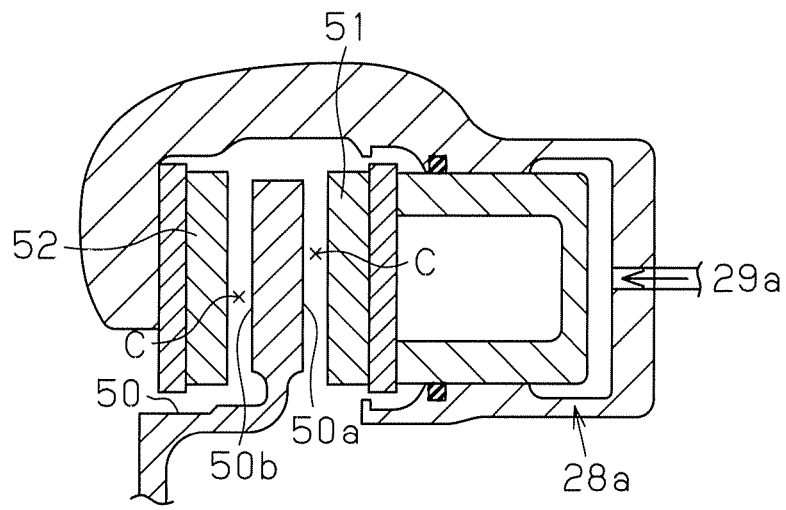
FIG. 3A is a schematic diagram illustrating a state where a brake rotor and a brake pad do not contact with each other.
Figure 3B:
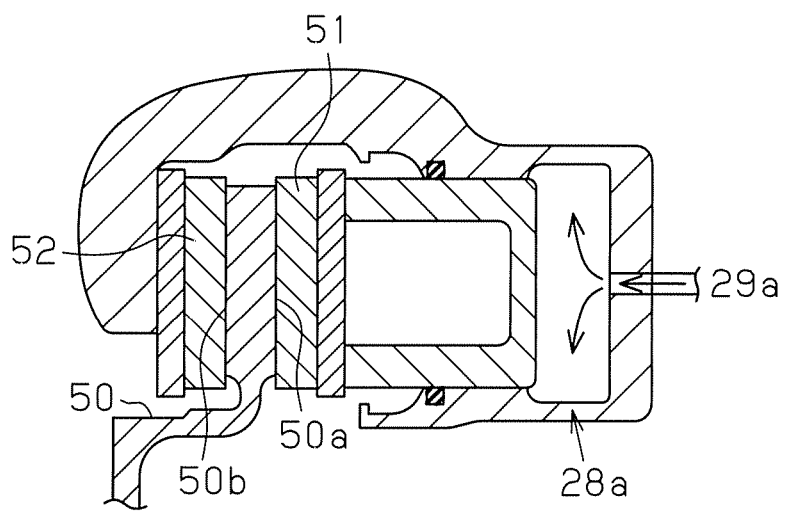
FIG. 3B is a schematic end view illustrating a state where the brake rotor and the brake pad contact with each other.

As illustrated in FIGS. 3A and 3B, the disk brake device 15 includes a brake rotor 50 rotating integrally with the left front wheel FL, a brake pad 51 disposed in a state opposed to a first sliding contact surface 50a of the brake rotor 50, and a braking pad 52 disposed in a state opposed to a second sliding contact surface 50b of the brake rotor 50. When the brake fluid does not flow into the wheel cylinder 28a from the brake device 13, the brake pads 51 and 52 are disposed in a state where a clearance C of predetermined gap is present between the brake pad 51 or 52 and the corresponding opposing sliding contact surface 50a or 50b, respectively.

On the other hand, when the brake fluid flows into the wheel cylinder 28a from the brake device 13, as a result of the generation of the brake hydraulic pressure inside the wheel cylinder 28a, the driving force corresponding to the inflow of the brake fluid is provided to the brake pads 51 and 52 so that the brake pads 51 and 52 relatively approach the brake rotor 50. Then, when the brake hydraulic pressure inside the wheel cylinder 28a reaches reference brake hydraulic pressure, which will be described later, each brake pad 51 and 52 slides to contact with each sliding contact surface 50a and 50b. When the brake fluid further flows into the wheel cylinder 28a in a state where each brake pad 51 and 52 contacts each sliding contact surface 50a and 50b, each brake pad 51 and 52 mutually presses the brake rotor 50. As a result, the left front wheel FL is provided a braking force the magnitude of which corresponds to the brake fluid volume inside the wheel cylinder 28a, or the brake hydraulic pressure.

Figure 4:
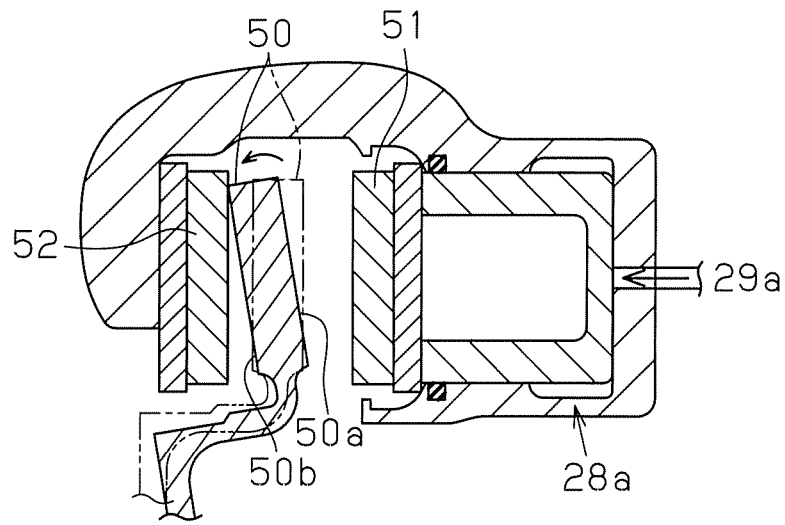
FIG. 4 is a schematic end view illustrating a state where the brake rotor inclines to the brake pad.

To such brake rotor 50 of the disk brake device 15, a reaction force from the road on which the vehicle travels is provided via the left front wheel FL. When such reaction force is large, as illustrated in FIG. 4, the brake rotor 50 may incline to each brake pad 51 and 52. When the inclination degree of the brake rotor 50 is large, at least one from the brake pad 51 and the brake pad 52 is pressed to the brake rotor 50 so that the brake pad 51 moves in a direction to be away from the brake rotor 50. To make the brake pads 51 and 52 to slide on the sliding contact surfaces 50a and 50b of the brake rotor 50 in this state, it is necessary to let the larger amount of brake fluid flow into the wheel cylinder 28a as compared with the case where the brake pad 51 is not pressed to the brake rotor 50.

Next, the configuration of the ECU 14 will be described with reference to FIGS. 1 and 2. As illustrated in FIGS. 1 and 2, a brake switch SW1, wheel speed sensors SE1, SE2, SE3, and SE4 for calculating the wheel speeds of wheels FR, FL, RR, and RL, respectively, and an operation amount sensor SE5 for calculating an operation amount or depression amount of the acceleration pedal 10 are electrically connected with a non-illustrated input interface of the ECU 14. A deceleration sensor SE6 for calculating the deceleration in the front and rear direction of the vehicle, an acceleration sensor SE7 for calculating acceleration in a traverse direction of the vehicle, and an external temperature sensor SE8 for detecting the temperature of the ambient air of the outside the vehicle, or the external temperature, are also electrically connected with the input interface. The deceleration sensor SE6 outputs a signal indicating a positive value when the vehicle decelerates in the forward direction, whereas it outputs a signal indicating a negative value when the vehicle accelerates.

The proportional solenoid valve 24 and 25, the first solenoid valve 31 to 34, the second solenoid valves 35 to 38, and the motor M are electrically connected with a non-illustrated output interface of the ECU 14. The ECU 14, based on the input signals from the brake switch SW1 and various types of sensors SE1 to SE8, individually controls the driving of each proportional solenoid 24 and 25, each first solenoid valve 31 to 34, each second solenoid valve 35 to 38, and the motor M.

Figure 5:
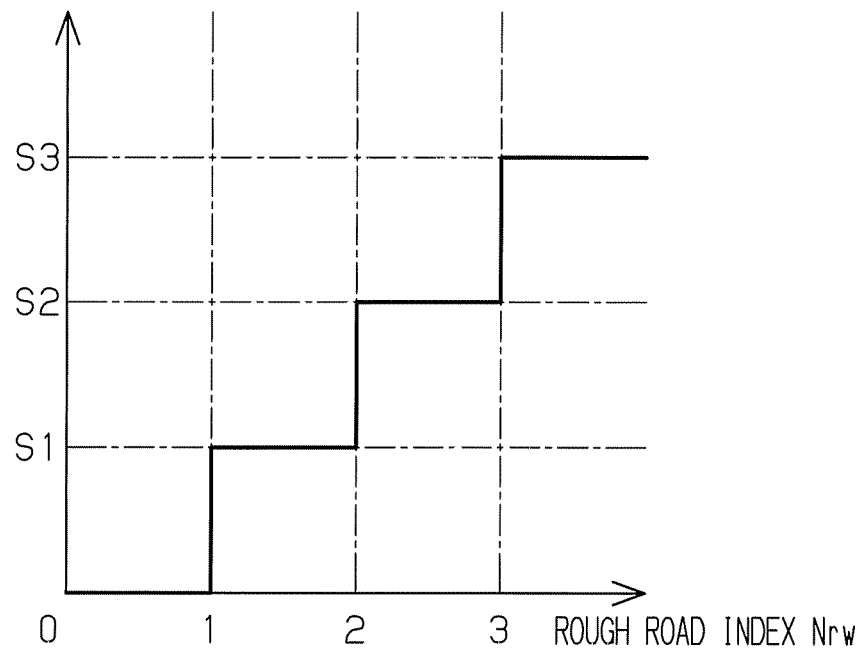
FIG. 5 is a map illustrating a relationship between a rough road index and a discharge amount of the brake fluid per unit of time of a pump.

The ECU 14 includes a CPU 55, a ROM 56, and a RAM 57. The ROM 56 stores various types of control processing (processing as brake fluid supply control processing, which will be described later), various types of maps (the map as illustrated in FIG. 5), and various types of threshold values (a predetermined time, a first distribution threshold value, a second distribution threshold value, a third distribution threshold value, a rough road index threshold value, a vehicle speed threshold value, a transverse direction acceleration threshold value, a deceleration threshold value, an operation amount threshold value, and the like, which will be described later) in advance. The RAM 57 temporarily stores various types of information properly re-written (wheel acceleration, post-filtering wheel acceleration, a distribution value, a rough road index, a rough road index maximum value, vehicle speed, transverse direction acceleration, forward-backward deceleration, an operation amount of the acceleration pedal 10, a driving hour, a driving flag, a rough road flag, and the like, which will be described later) while a non-illustrated ignition switch of the vehicle is "on".

Next, a map stored in the ROM 56 will be described with reference to FIG. 5. The map illustrated in FIG. 5 is a map for setting a driving mode of the motor M when the road on which the vehicle travels changes from a rough road having a road surface of relatively large degree of roughness to a smooth road having a road surface of relatively small degree of roughness. The map shows a relationship between a rough road index Nrw when the vehicle travels on the rough road and a discharge amount S of the brake fluid from the pumps 41 and 42 per unit hour. The "rough road index Nrw" numerically indicates a degree of roughness in the road surface, and the higher the value is, larger the roughness degree is.

In the map illustrated in FIG. 5, the discharge amount S is set to be larger as the rough road index Nrw becomes large. Specifically, when the rough road index Nrw of the road on which the vehicle travels is "0", the discharge amount S is set to "0" since the vehicle travels on the smooth road and the wheels FR, FL, RR, and RL receive relatively small reaction force from the road surface. When the rough road index Nrw of the road on which the vehicle travels is "1", the discharge amount S is set to a first discharge amount S1 since the wheels FR, FL, RR, and RL receive the reaction force from the road surface that is larger than in the case where the road surface is smooth. The first discharge amount S1 is a discharge amount capable of adjusting the brake hydraulic pressure inside each wheel cylinder 28a to 28d to "0.1 Mpa".

When the rough road index Nrw of the rough surface on which the vehicle travels is "2", the discharge amount S is set to a second discharge amount S2 that is larger than the first discharge amount S1, since the wheels FR, FL, RR, and RL receive the reaction force from the road surface that is larger than in the case where the rough road index Nrw is "1". The second discharge amount S2 is a discharge amount capable of adjusting the brake hydraulic pressure inside each wheel cylinder 28a to 28d to "0.3 Mpa". When the rough road index Nrw of the rough surface on which the vehicle travels is "3", the discharge amount S is set to a third discharge amount S3 that is larger than the second discharge amount S2, since the wheels FR, FL, RR, and RL receive the reaction force from the road surface that is larger than in the case where the rough road index Nrw is "2". The third discharge amount S3 is a discharge amount capable of adjusting the brake hydraulic pressure inside each wheel cylinder 28a to 28d to "0.5 Mpa".

In the present embodiment, the road in which the rough road index Nrw is "0" is a road paved with asphalt or the like. The road in which the rough road index Nrw is "1" is a gravel road. The road in which the rough road index Nrw is "2" is a stone pavement and the road in which the rough road index Nrw is "3" is a road having a road surface the roughness degree of which is extremely large. In the present embodiment, the road having the rough road index Nrw of "1" or more is referred to as a rough road. However, when the vehicle travels on the road having rough road index Nrw of "1", the reaction force that the wheels FR, FL, RR, RL receive from the road surface is relatively small, and the inclination angles of the brake rotor 50 relative to the brake pads 51 and 52 are extremely small.

Figure 7:
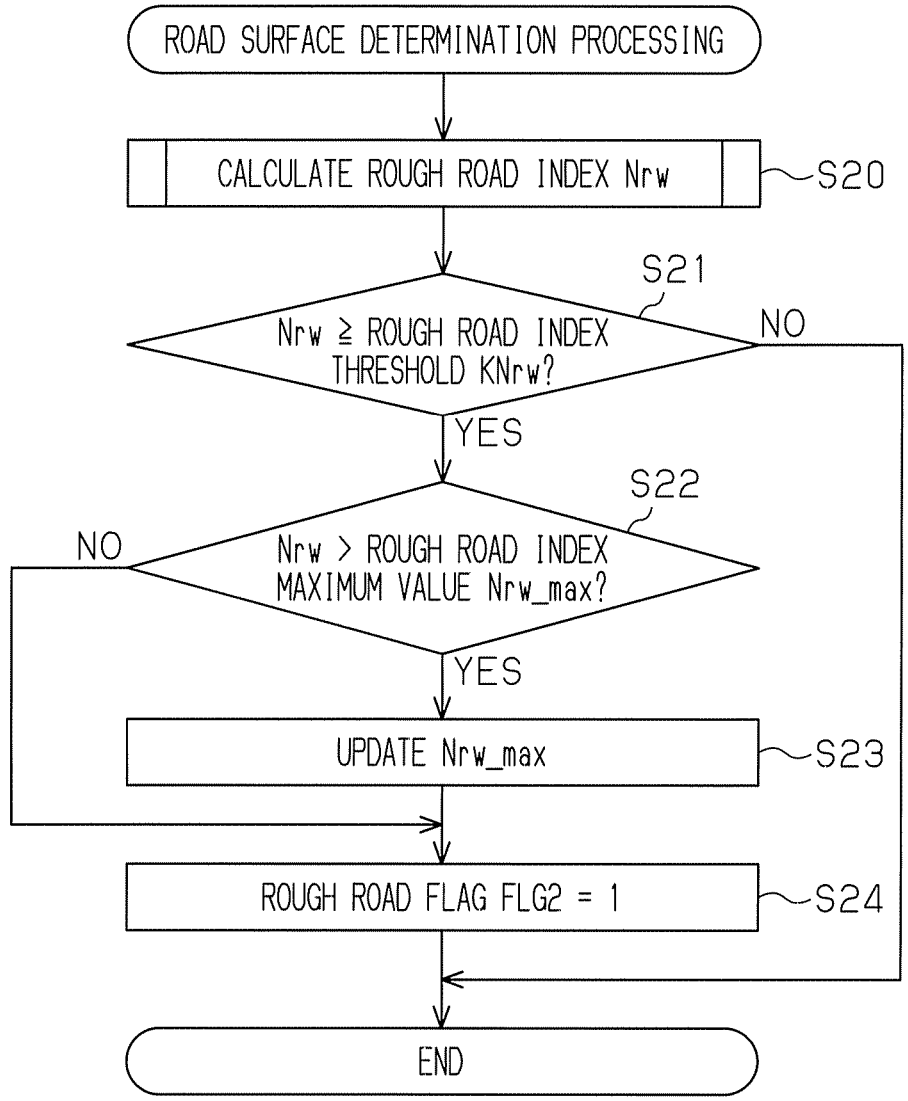
FIG. 7 is a flowchart explaining road surface determination routine according to the first embodiment.
Figure 8:
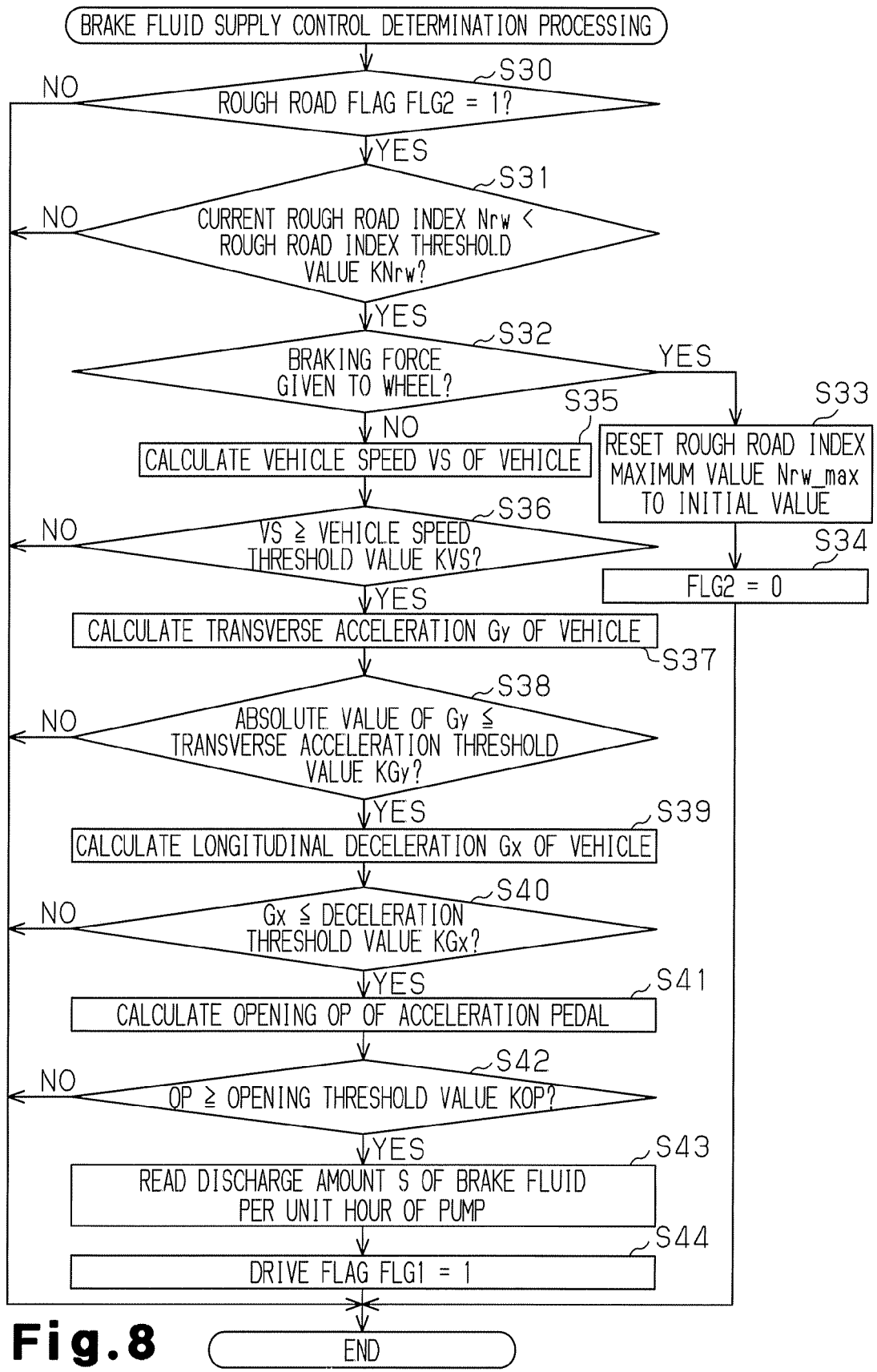
FIG. 8 is a flowchart explaining the brake fluid supply control determination routine according to the first embodiment.

Next, from among various types of control processing executed by the ECU 14, brake fluid supply control routine for reducing or eliminating the inclination of the brake rotor 50 relative to each brake pad 51 and 52 as described above will be described with reference to the flow charts illustrated in FIGS. 6 to 8 and the timing charts illustrated in FIGS. 9A and 9B.

Now, the ECU 14 executes the brake fluid supply control routine in a predetermined cycle (for example, every "0.01 second"). Then, in this routine, the ECU 14 executes road surface determination processing (step S10), which will be described in further detail in FIG. 7. At the step S10, the rough road index Nrw of the road on which the vehicle travels is calculated, and it is determined whether the road on which the vehicle travels is a rough road or a smooth road, based on the calculation result. Subsequently, the ECU 14 executes the brake fluid supply processing (step S11), which will be described in further detail in FIG. 8. At the step S1, it is determined whether the conditions for supplying the brake fluid into the wheel cylinders 28a to 28d are satisfied, and the discharge amount S of the brake fluid per unit hour from the pumps 41 and 42, i.e., the driving mode of the motor M, is also set.

The ECU 14, based on the execution at the step S11, determines whether a drive flag FLG 1 for determining permission of the drive of the motor M is set to "1" or not (step S12). This drive flag FLG 1 is set to "1" when the conditions for supplying the brake fluid into the wheel cylinders 28a to 28d are satisfied, whereas it is set to "0" when the conditions are not satisfied. If the determination result at step S12 is negative (FLG1="0"), the ECU 14 determines that the vehicle is in the midst of traveling on the rough road or has no experience in traveling on the rough road, and terminates the brake fluid supply control routine.

On the other hand, if the determination result at step S12 is affirmative (FLG1="1"), the ECU 14 controls the drive of the motor M so that the brake fluid of the discharge amount S set at step S11 is discharged from the pumps 41 and 42 (step S13). The ECU 14 determines if the drive time Tm, which is the time passed after starting the drive of the motor M, is a predetermined threshold value KTm (for example "two seconds") or more (step S14). This threshold value KTm is the time required for making each brake pad 51 and 52 to slide on the sliding contact surfaces 50a and 50b of the brake rotor 50 and for reducing or eliminating the inclination of each brake pad 51 and 52 of the brake rotor 50, and is set in advance by experiments or simulations. When the time in which the brake rotor 50 comes into contact with each brake pad 51 and 52 is too long, it is highly possible that the driver perceives the imparting of the braking force to the wheels FR, FL, RR, and RL based on this contact. Thus, the threshold value KTm is preferably set to a short time (for example, "three seconds or less") to the extent that the driver does not perceive the contact between the brake rotor 50 and the respective brake pads 51 and 52.

If the determination result at step S14 is negative (Tm<KTm), the ECU 14 repeatedly executes each processing at steps S13 and S14 until the determination result at step S14 becomes affirmative. On the other hand, if the determination result at step S14 is affirmative (Tm≥KTm), the ECU 14 stops the drive of the motor M (step S15). In this regard, in the first embodiment, the ECU 14 also functions as a controlling section. Steps S13, S14, and S15 constitute driving steps.

Then the ECU 14 resets the drive FLGL to "0" (step S16), and resets a rough road index maximum value Nrw_max, which will be described later, to the initial value ("0" in this embodiment) (step S17). Subsequently, the ECU 14 rests a rough road FLG2 for determining whether the vehicle has experienced traveling on the rough road or not to "0" (step S18). This rough road flag FLG2 is set to "1" when the vehicle has experienced traveling on the rough road, whereas it is set to "0" when the vehicle has no experience on traveling the rough road. After that, the ECU 14 terminates the brake fluid supply control routine.

Next, the road surface determination routine at the step S10 will be described with reference to the timing chart illustrated in FIG. 7 and the timing charts illustrated in FIGS. 9A and 9B. In the road surface determination routine, the ECU 14 calculates the rough road index Nrw that indicates the roughness degree of the road surface (step S20). Specifically, the ECU 14, calculates the wheel speed of each wheel FR, FL, RR, and RL based on the signals from each wheel speed sensor SE1 to SE4 and differentiate the wheel speed to calculate wheel acceleration DVW (refer to FIGS. 9A and 9B) of each wheel FR, FL, RR, and RL. The ECU 14 obtains rear wheel acceleration DVWF, from which the low frequency component is removed, for every wheel FR, FL, RR, and RL by performing filtering processing for taking out the high frequency component of the wheel acceleration DVW.

Figure 9A:
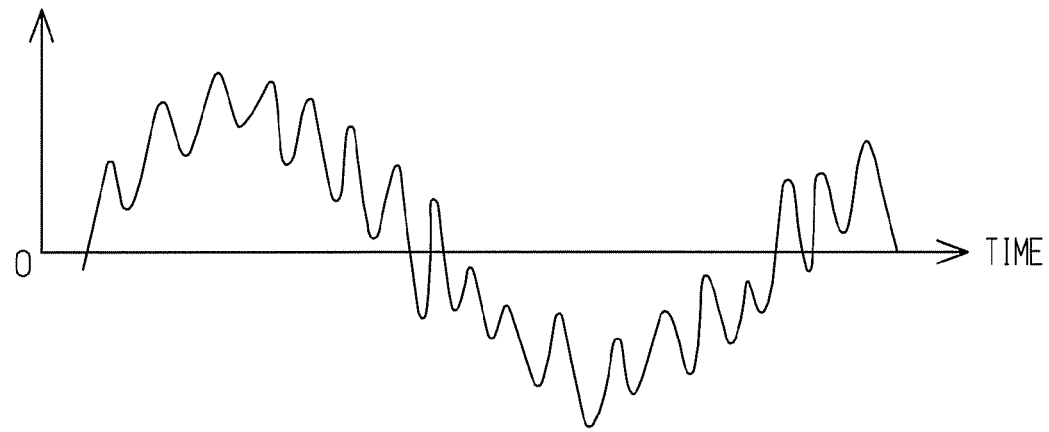
FIG. 9A is a timing chart illustrating the variation in a wheel acceleration of a wheel.
Figure 9B:
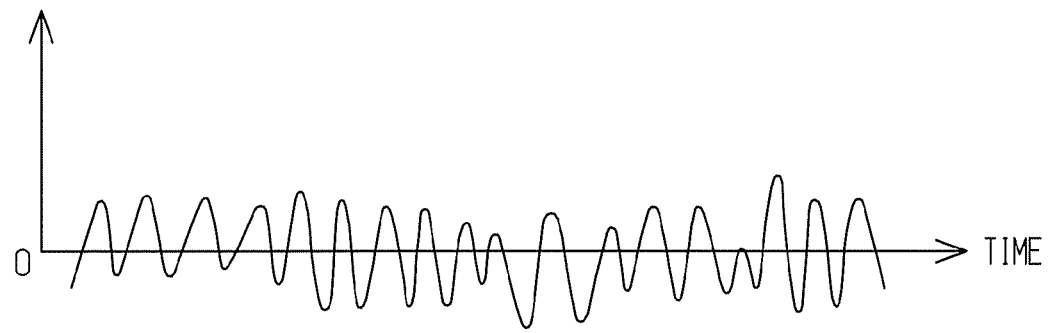
FIG. 9B is a timing chart illustrating the variation in post-filtering wheel acceleration.

That is, as illustrated in FIG. 9A, the wheel acceleration DVW of the wheels FR, FL, RR, and RL before the filtering processing includes the original acceleration component of the wheels FR, FL, RR, and RL and vibration component based on the reaction force received from the road surface. The vibration frequency representing the variation of such vibration component becomes higher than the acceleration frequency representing the variation of the acceleration component. Thus, in this embodiment, by using the filtering processing, i.e., a high pass filter, post-filtering wheel acceleration DVWF is taken out from the wheel acceleration DVW, as illustrated in FIG. 9B.

After the post-filtering wheel acceleration DVWF of the predetermined number of samples is taken out for each wheel FR, FL, RR, and RL, the ECU 14 calculates the distribution value of the post-filtering wheel acceleration DVWF for each wheel FR, FL, RR, and RL. These distribution values are values in which the values obtained by squaring each post-filtering wheel acceleration DVWF are integrated and the integrated values are divided by the number of samples. The ECU 14 sets the rough road index Nrw to "0" when the maximum value (for example, the distribution value corresponding to the left front wheel FL) from among the distribution values for the wheels FR, FL, RR, and RL is smaller than the first distribution threshold value, which has been set in advance. The ECU 14 sets the rough road index Nrw to "1" when the maximum value from among the distribution values is equal to or larger than the first distribution threshold value and smaller than the second distribution threshold value, which has been set in advance to the value larger than the first distribution threshold value. The ECU 14 sets the rough road index Nrw to "2" when the maximum value from among the distribution values is equal to or more than the second distribution threshold value, and smaller than a third distribution threshold value, which has been set in advance to the value larger than the second distribution threshold value. The ECU 14 sets the rough road index Nrw to "3" when the maximum value from among the distribution values is equal to or more than the third distribution threshold value. Each distribution threshold value is a value for setting the rough road index Nrw to from "0" to "3" according to the magnitude of the distribution value, and is set in advance by experiments or simulations. In this regard, in this embodiment, the ECU 14 also functions as a rough road index calculating section. Step S20 corresponds to the rough road index calculating step.

Next, the ECU 14 determines if the rough road index Nrw calculated at step S20 is equal to or more than a rough road index threshold value KNrw set in advance ("1" in this embodiment) (step S21). This rough road index threshold value KNrw is a reference value by which it is determined whether the road on which the vehicle travels is a rough road or a smooth road, and is set in advance by experiments or simulations. If the determination result at step 21 is negative (Nrw≤KNrw), the ECU 14 determines that the vehicle is in the midst of traveling on the smooth road, and terminates the brake fluid supply control routine.

On the other hand, if the determination result at step S21 is affirmative (Nrw≥KNrw), the ECU 14 determines whether the rough road index Nrw calculated at step S20 is larger than the rough road index maximum value Nrw_max stored in the RAM 57 or not (step S22). If the determination result is negative (Nrw≤Nrw_max), the ECU 14 proceeds the processing to step S24, which will be described later. On the other hand, if the determination result at step S22 is affirmative (Nrw>Nrw_max), the ECU 14 updates the rough road index maximum value Nrw_max to the rough road index Nrw calculated at step S20 (step S23), and then proceeds the processing to the next step S24.

At step S24, the ECU 14 sets the rough road index FLG2 to "1", and then terminates the brake fluid supply control routine.

Next, the brake fluid supply control determination routine at the step S11 will be described with reference to the flow chart illustrated in FIG. 8. In the brake fluid supply control determination routine, the ECU 14 determines whether the rough road flag FLG2 is set to "1" or not (step S30). Then, the ECU 14 determines whether the current rough road index Nrw calculated at the step S20 is smaller than the rough road index threshold value KNrw or not (step S31). That is, at steps S30 and S31, it is determined if the road on which the vehicle travels is changed from the rough road to the smooth road. The ECU 14 determines if at least one of each wheel FR, FL, RR, and RL is provided the braking force (step S32). Specifically, the ECU 14 determines that at least one of the wheel among the wheels FR, FL, RR, and RL is provided the braking force when the driver steps on the brake pedal 11 and operates and the motor M is in driving.

If the determination result at step S32 is affirmative, the ECU 14 resets the rough road index maximum value Nrw_max to the initial value ("0" in this embodiment) (step S33). Subsequently, the ECU 14 sets the rough road flag FLG2 to "0" (step S34), and then terminates the brake fluid supply control determination routine.

On the other hand, if the determination result at step S32 is negative, the ECU 14 calculates the wheel speed of each wheel FR, FL, RR, and RL based on each signal from each wheel speed sensor SE1 to SE4, and use each of these wheel speeds to calculate the vehicle speed VS of the vehicle by (step S35). In this regard, in this embodiment, the ECU 14 also functions as a vehicle speed calculating section. The ECU 14 determines if the vehicle speed VS of the vehicle calculated at step S35 is equal to or more than a vehicle speed threshold value KVS ("30 km/h" in this embodiment) set in advance (step S36). The vehicle speed threshold value KVS is the minimum speed in which the driver does not have deceleration feeling caused by the brake fluid made flow into the wheel cylinders 28a to 28d to make each brake pad 51 and 52 to slide on the brake rotor 50 based on the driving of the pumps 41 and 42 in the processing of the step S13. The value KVS is set in advance by experiments or simulations.

If the determination result at step S36 is negative (VS<KVS), the ECU 14 terminates the brake fluid supply control determination routine. On the other hand, if the determination result at step S36 is affirmative (VS≥KVS), the ECU 14 calculates a lateral acceleration Gy of the vehicle based on the signal from the acceleration sensor SE7 (step S37). In this regard, in this embodiment, the ECU 14 also functions as a lateral acceleration calculating section. Then, the ECU 14 determines if the absolute value of the lateral acceleration Gy calculated at step S37 is not more than the lateral acceleration threshold value Kgy set in advance (step S38). The lateral acceleration threshold value Kgy is a value for determining whether the behavior of the vehicle is unstable due to the turning of the vehicle and is set in advance by experiments or simulations.

If the determination result at step S38 is negative (the absolute value of Gy>KGy), the ECU 14 determines that the behavior of the vehicle is unstable, and terminates the brake fluid supply control determination routine. On the other hand, if the determination result at step S38 is affirmative (the absolute value of Gy≤KGy), the ECU 14 calculates a longitudinal deceleration Gx of the vehicle based on the signal from the deceleration sensor SE6 (step S39). In this regard, in this embodiment, the ECU 14 also functions as a deceleration calculating section. Subsequently, the ECU 14 determines if the longitudinal deceleration Gx calculated at step S39 is not more than a deceleration threshold value KGx set in advance ("0" in this embodiment) (step S40). This deceleration threshold value KGx is a value for determining whether the vehicle decelerates in the forward direction, and is set in advance by experiments or simulations.

If the determination result at step S40 is negative (Gx>KGx), the ECU 14 determines that the vehicle is during deceleration, and terminates the brake fluid supply control determination routine. On the other hand, if the determination result at step S40 is affirmative (Gx≤KGx), the ECU 14 calculates an operation amount OP, or depression amount of the acceleration pedal 10 based on the signal from the operation amount sensor SE5 (step S41). Subsequently, the ECU 14 determines if the operation amount OP calculated at step S41 is equal to or more than an operation amount threshold value KOP set in advance (step S42). This operation amount threshold value KOP is a value for determining whether the driver has an intention to accelerate the vehicle, and is set in advance by experiments or simulations.

If the determination result at step S42 is negative (OP<KOP), the ECU 14 determines that the driver has no intention to accelerate the vehicle, and terminates the brake fluid supply control determination routine. On the other hand, if the determination result at step S42 is affirmative (OP≥KOP), the ECU 14 reads the discharge amount S (for example, the second discharge amount S2) of the brake fluid per unit hour of the pumps 41 and 42 corresponding to the rough road index maximum value Nrw_max (for example, "2") temporarily stored in the RAM 57 from the map illustrated in FIG. 5 (step S43). Subsequently, the ECU 14 sets the drive flag FLG1 to "1" (step S44), and then terminates the brake fluid supply control determination routine.

Next, the brake control method of the vehicle in this embodiment will be described. It is premised that the rough road index maximum value Nrw_max during travel of the vehicle on the rough road is "3", and during the travel on the rough road, the brake pedal 11 is not stepped and operated.

When the vehicle travels on the rough road, the wheels FR, FL, RR, and RL are provided reaction forces the magnitude of which corresponds to the rough road index Nrw of the road surface from the road surface. Then, the brake rotor 50 rotating integrally with the wheels FR, FL, RR, and RL inclines to each brake pad 51 and 52 based on the reaction force from the road surface (see FIG. 4). When the brake rotor 50 inclines in this manner, the brake rotor 50 contacts the brake pad 51, and the brake pad 51 moves in a direction to be away from the brake rotor 50. At this time, since the inclination degree of the brake rotor 50 becomes larger as the rough road index Nrw of the road surface is larger, the moving amount of the brake pad 51 in the direction to be away from the brake rotor 50 becomes larger as the rough road index Nrw of the road on which the vehicle travels is larger.

When the rough road index Nrw of the road on which the vehicle travels is changed from "1" to "0", it is determined that the rough road travel of the vehicle is terminated, and the driving mode of the motor M is set. That is, when the rough road index Nrw is reduced from any state of "1", "2", and "3" to a state where the rough road index Nrw is "0", the driving mode of the brake device 13 is set. At this time, since the rough road index maximum value Nrw_max during the rough road travel is "3", the driving mode of the motor M is set such that the discharge amount S is a third discharge amount S3. That is, the discharge amount S is set to an amount larger than the discharge amount (in this case, the first discharge amount S1) corresponding to the previous rough road index Nrw (in this case, "1"). When it is confirmed that the vehicle speed VS of the vehicle is equal to or more than the vehicle speed threshold value KVS, the absolute value of the lateral acceleration Gy of the vehicle is smaller than the lateral acceleration threshold value KGy, the longitudinal deceleration Gx of the vehicle is smaller than the deceleration threshold value KGx, and the operation amount OP of the acceleration pedal 10 is equal to or more than the operation amount threshold value KOP, the motor M begins to drive.

Then, the brake fluid is discharged from each pump 41 and 42 into the supply passages 45 and 46 based on the driving of the motor M. A part of the brake fluid inside the supply passages 45 and 46 flows into the wheel cylinders 28a to 28d through first on-off valves 31 to 34, whereas the rest of the brake fluid flows toward the master cylinder 17 through the proportional solenoid valves 24 and 25. As a result, the brake fluid amount in each wheel cylinder 28a to 28d is gradually increased, and in accordance with this increase, the brake pad 51 approaches the brake rotor 50.

When the brake fluid further flows into each wheel cylinder 28a to 28d, the brake pad 51 presses the inclined brake rotor 50, thereby gradually reducing or eliminating the inclination of the brake rotor 50. When the brake fluid flows still further into each wheel cylinders 28a to 28d, each brake pad 51 and 52 is put into a state of sliding on each sliding contact surface 50a and 50b of the brake rotor 50, respectively, so that the inclination of the brake rotor 50 is reduced or eliminated. At this time, each wheel FR, FL, RR, and RL is hardly provided the braking force. Thus, the driver of the vehicle has no feeling of deceleration, that is, a feeling of drag, to let the vehicle travel.

The first embodiment has the following advantages.

(1) When the road on which the vehicle travels changes from the rough road to the smooth road, the driving force is provided from the wheel cylinders 28a to 28d, so that the brake pads 51 and 52 relatively approach the brake rotor 50. As a result, even if the brake rotor 50 inclines to the brake pads 51 and 52 caused by the reaction force that the wheels FR, FL, RR, and RL having received from the rough road during travel of the vehicle on the rough road, the inclination of the brake rotor 50 is reduced or eliminated after the vehicle terminates the travel on the rough road. Thus, during the travel of the vehicle, a part of the brake rotor 50 is prevented from continuing to contact the brake pads 51 and 52. As a result, the occurrence of uneven wear of the brake rotor 50 and the brake pads 51 and 52 is suppressed. Moreover, since the inclination of the brake rotor 50 is reduced or eliminated after the road on which the vehicle travels changes from the rough road to the smooth road, the inclination of the brake rotor 50 can be reduced or eliminated only by driving the brake device 13 by the minimum necessity, and the posture of the brake rotor 50 can be suitably maintained. Since the brake device 13 is not driven during the travel on the rough road of the vehicle and when the vehicle has no experience in travel on the rough road, total the power consumption of the brake device 13 overall is reduced as compared with the case where the brake device 13 continues to drive overall period of the travel of the vehicle. Consequently, not only the increase in the total power consumption of the brake device 13 is suppressed but also the occurrence of the uneven wear of the brake rotor 50 and the brake pads 51 and 52 can be suppressed.

(2) The time for driving the brake device 13 to make the brake pads 51 and 52 to relatively approach the brake rotor 50 after terminating the travel on the rough road of the vehicle is only the threshold value KTm set in advance. That is, as compared with the case where the brake device 13 continues to drive after the termination of the rough road travel of the vehicle, the driving time of the brake device 13 is shorten. This makes the reduction of the total power consumption of the brake device 13 possible by the amount corresponding to the shortened period.

(3) In general, the reaction force which the wheels FR, FL, RR, and RL receive from the road surface becomes larger as the rough road index Nrw of the road on which the vehicle travels becomes larger, and the inclination degree of the brake rotor 50 to the brake pads 51 and 52 also becomes larger. That is, the moving amount of the brake pad 51 in the direction to be away from the brake rotor 50 also becomes large. In the first embodiment, the flow rate of the brake fluid into the wheel cylinders 28a to 28d per unit hour becomes larger as the rough road index maximum value Nrw_max becomes larger. Thus, the driving force provided to the brake pad 51 becomes large. Thus, the brake pads 51 and 52 are securely made contact with the brake rotor 50, and the inclination of the brake rotor 50 can be reduced or eliminated.

(4) When the braking force is provided to the wheels FR, FL, RR, and RL before the brake device 13 is driven in order to reduce or eliminate the inclination of the brake rotor 50 after the termination of the rough road travel of the vehicle, it is highly possible that the inclination of the brake rotor 50 has been already eliminated, since the brake pads 51 and 52 contact the brake rotor 50 when the braking force was given. Thus, in the first embodiment, when the braking force is provided to the wheels FR, FL, RR, and RL after the termination of the rough road travel of the vehicle, the driving of the brake device 13 for reducing or eliminating the inclination of the brake rotor 50 is regulated. Consequently, unnecessary driving of the brake device 13 can be prevented despite of the fact that the inclination of the brake rotor 50 has been already eliminated.

(5) When the vehicle speed VS of the vehicle is lower than the vehicle speed threshold value KVs, even if the braking force as a result of the sliding of the brake pads 51 and 52 on the brake rotor 50 is extremely small, the driver may feel a feeling of deceleration, or a feeling of drag. In this regard, in the first embodiment, when the vehicle speed VS at the starting timing of each processing of each step S13, S14, and S15 is lower than the vehicle speed threshold value KVS, the driving of the brake device 13 for reducing or eliminating the inclination of the brake rotor 50 is regulated. Thus, the feeling of deceleration is not provided to the driver unnecessarily.

(6) At the starting timing of each processing of the steps S13, S14, and S15, when absolute value of the lateral acceleration Gy of the vehicle exceeds the lateral acceleration threshold value KGy, the brake pads 51 and 52 slides to the brake rotor 50, which may enhance an unstable behavior of the vehicle. In this regard, in the first embodiment, when the lateral acceleration Gy of the vehicle exceeds the lateral acceleration threshold value KGy, the driving of the brake device 13 for reducing or eliminating the inclination of the brake rotor 50 is regulated. Thus, the unstable behavior of the vehicle due to the execution of the brake fluid supply control routine can be prevented.

(7) At the starting timing of each processing of the steps S13, S14, and S15, when the longitudinal deceleration Gx of the vehicle is not more than the deceleration threshold value KGx, it is determined that the driver has an intention to accelerate the vehicle, so that the brake device 13 is driven to reduce or eliminate the inclination of the brake rotor 50. Thus, different from the case where the brake device 13 is driven to reduce or eliminate the inclination of the brake rotor 50 during the deceleration of the vehicle, the feeling of deceleration provided to the driver, which is caused by the brake pads 51 and 52 being brought into contact with the brake rotor 50, can be suppressed.

(8) When it is determined that the driver has an intention to accelerate the vehicle based on the stepping operation of the acceleration pedal 10 by the driver, the brake device 13 is driven to reduce or eliminate the inclination of the brake rotor 50. Thus, different from the case where the brake device 13 is driven to reduce or eliminate the inclination of the brake rotor 50 when the driver has no intention to accelerate the vehicle, the feeling of deceleration provided to the driver, which is caused by the brake pads 51 and 52 being brought into contact with the brake rotor 50, can be suppressed.

Figure 10:
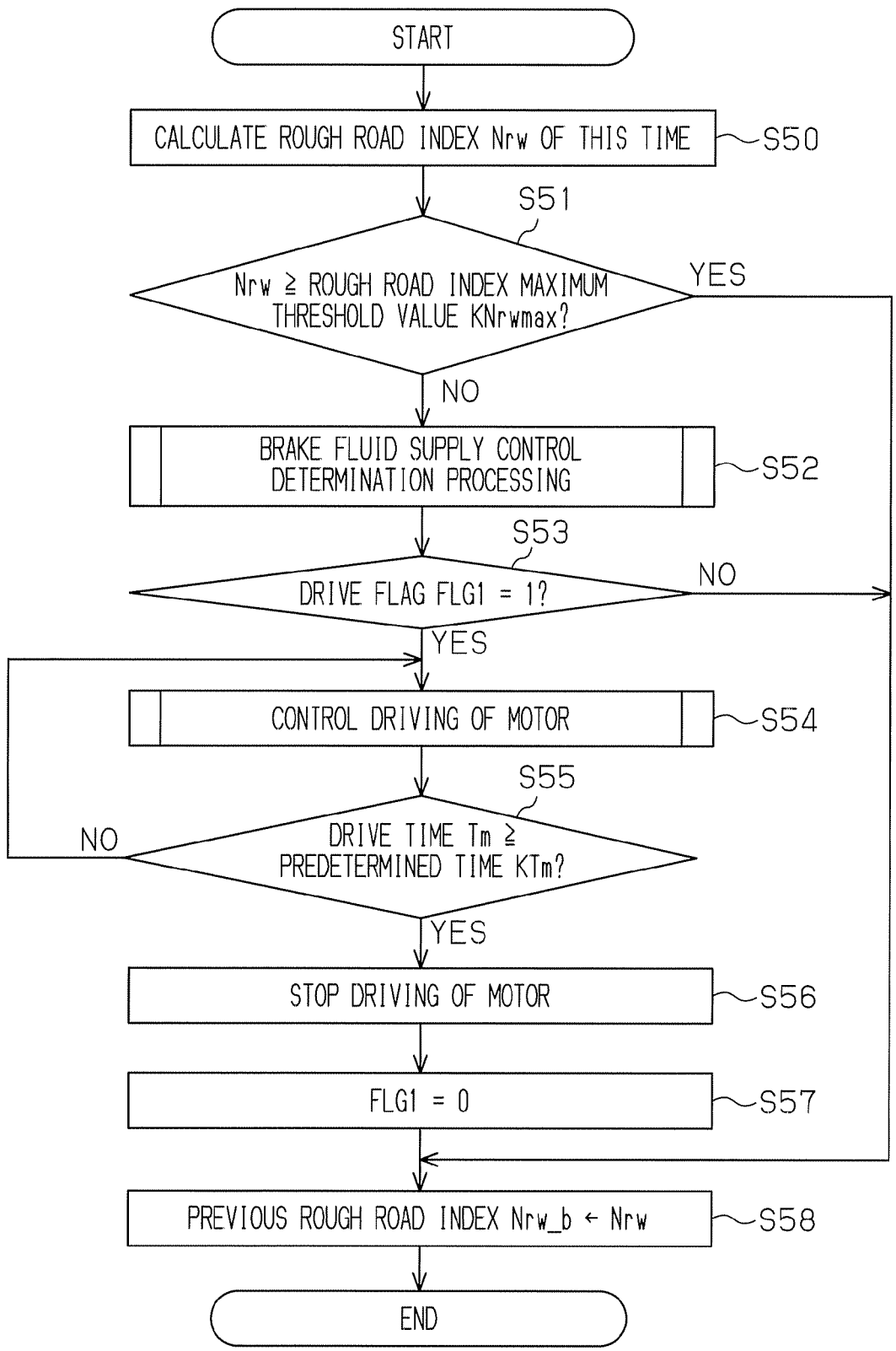
FIG. 10 is a flow chart explaining the brake fluid supply control routine according to a second embodiment.

Next, a second embodiment of the present invention will be described in accordance with FIGS. 10 to 12. The second embodiment is different from the first embodiment in that a part of the brake fluid supply control routine is different. Consequently, the following description will mainly describe the part different from the first embodiment. The same or equivalent constituent members as the first embodiment are provided the same reference numerals and the repeated explanation thereof will be omitted.

In the second embodiment, brake fluid supply control routine executed by an ECU 14 will be described with reference to the flowcharts illustrated in FIGS. 10 and 11.

The ECU 14 executes the brake fluid supply control routine in a predetermined cycle T (see FIG. 12). In the brake fluid supply control routine, the ECU 14 performs the processing equivalent to the processing at the step S20, and calculates a rough road index of a road surface on which a vehicle travels at the current point, i.e., a current rough road index Nrw (step S50). In the second embodiment, step S50 corresponds to a rough road index calculating step.

Subsequently, the ECU 14 determines if the current rough road index Nrw calculated at step S50 is equal to or more than a rough road large threshold value KNrwmax set in advance ("3" in this embodiment) (step S51). This rough road large threshold value KNrwmax is a reference value for determining if the vehicle travels on the road surface in which the brake rotor 50 immediately inclines to each brake pad 51 and 52 even when the brake control to reduce or eliminate the inclination of the brake rotor 50 to each brake pad 51 and 52 is performed at this timing. The value KNrwmax is set in advance by experiments or simulations. If the determination result at step S51 is affirmative (Nrw≥KNrwmax), the ECU 14 proceeds the processing to step S58, which will be described later, in order to regulate the brake control at this timing.

Figure 11:
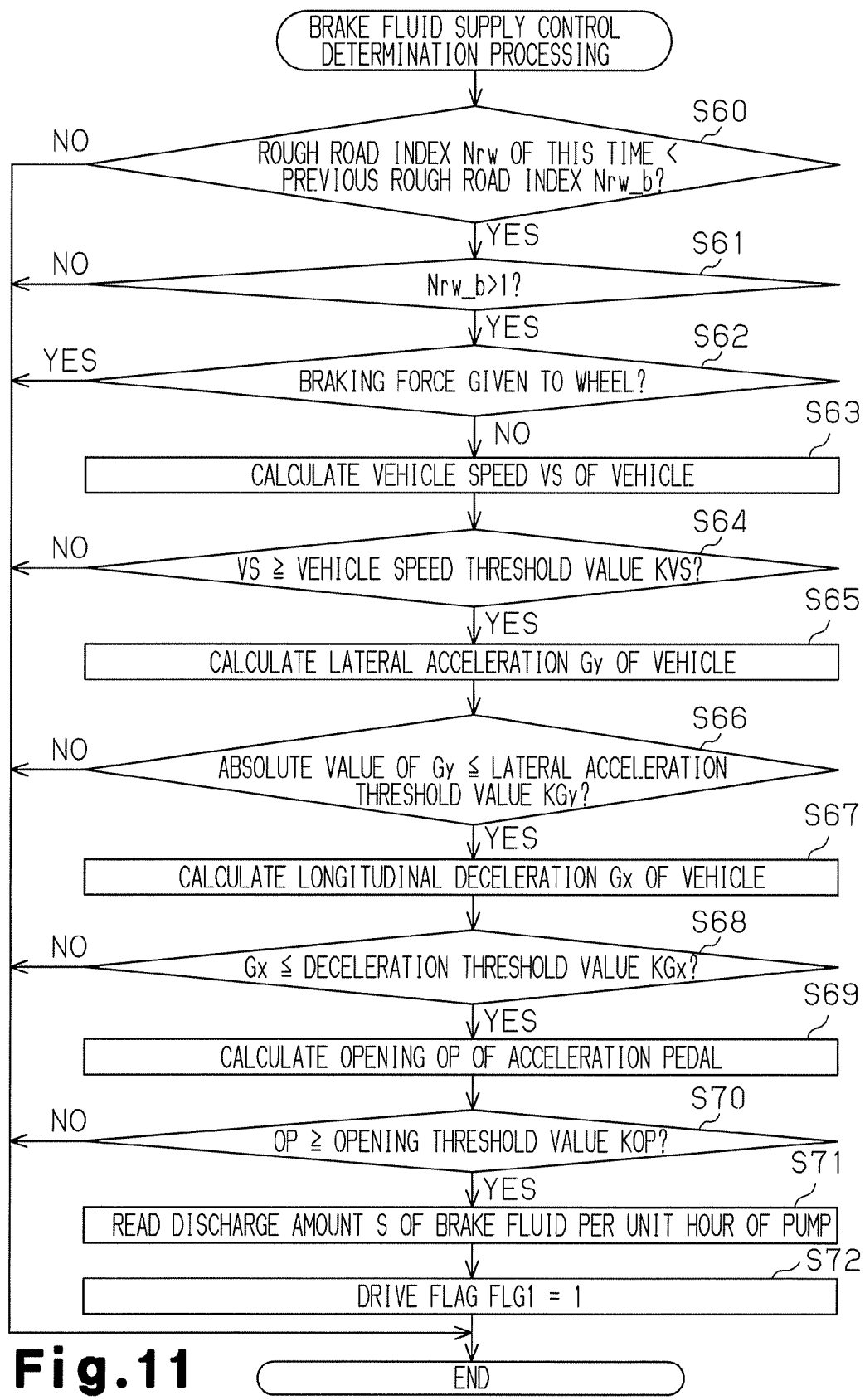
FIG. 11 is a flowchart explaining the brake fluid supply control determination routine according to the second embodiment.

On the other hand, if the determination result at step S51 is negative (Nrw<KNrwmax), the ECU 14 executes a brake fluid supply processing to be described in detail in FIG. 11 (step S52). At step S52, it is determined whether the condition for supplying the brake fluid into the wheel cylinders 28a to 28d is satisfied, and the discharge amount S of the brake fluid per unit hour from the pumps 41 and 42, that is, the driving mode of the motor M is set.

After the termination of the brake fluid supply processing, the ECU 14 executes each processing at steps S53, S54, S55, S56, and S57 which are equivalent to each at the steps S12, S13, S14, S15, and S16. In the second embodiment, steps S54, S55, and S56 constitute driving steps. After that, the ECU 14 proceeds the processing to the next step S58.

At step S58, the ECU 14 updates a previous rough road index Nrw_b to the current rough road index Nrw calculated at step S50, and terminates the brake fluid supply control routine. The previous rough road index Nrw_b is a rough road index calculated at step S50 at the previous brake fluid supply control routine.

Next, the brake fluid supply routine at the step S52 will be described with reference to the flow chart illustrated in FIG. 11. In the brake fluid supply routine, the ECU 14 determines whether the current rough road index Nrw is smaller than the previous rough road index Nrw_b or not (step S60). If this determination result is negative (Nrw≥Nrw_b), the ECU 14 determines that the tendency that unevenness degree of the road on which the vehicle travels becomes smaller is not recognized, and terminates the brake fluid supply routine. On the other hand, if the determination result at step S60 is affirmative (Nrw<Nrw_b), the ECU 14 determines that the tendency that unevenness degree of the road surface becomes smaller is recognized, and determines whether the previous rough road index Nrw_b is larger than "1" or not (step S61). If this determination result is negative (Nrw_b≤"1"), the ECU 14 determines that the brake rotor 50 does not incline to each brake pad 51 and 52 or its inclination angle is extremely small and a so-called knock back does not occur, and terminates the brake fluid supply routine.

On the other hand, if the determination result at step S61 is affirmative (Nrw_b>"1"), the ECU 14 determines that there is a possibility of the occurrence of the knock back, and executes the determination processing at step S62 which corresponds to the determination processing at the step S32. If this determination result is affirmative, the ECU 14 determines that the braking force is provided to the wheels FR, FL, RR, and RL after the above tendency is recognized, and terminates the brake fluid supply routine.

On the other hand, if the determination result at step S62 is negative, the ECU 14 executes each processing of steps S63, S64, S65, S66, S67, S68, S69, S70, S71, and S72 in order which are equivalent to processing at the steps S35, S36, S37, S38, S39, S40, S41, S42, S43, and S44. Then, the ECU 14 terminates the brake fluid supply routine.

Figures 12A, 12B:
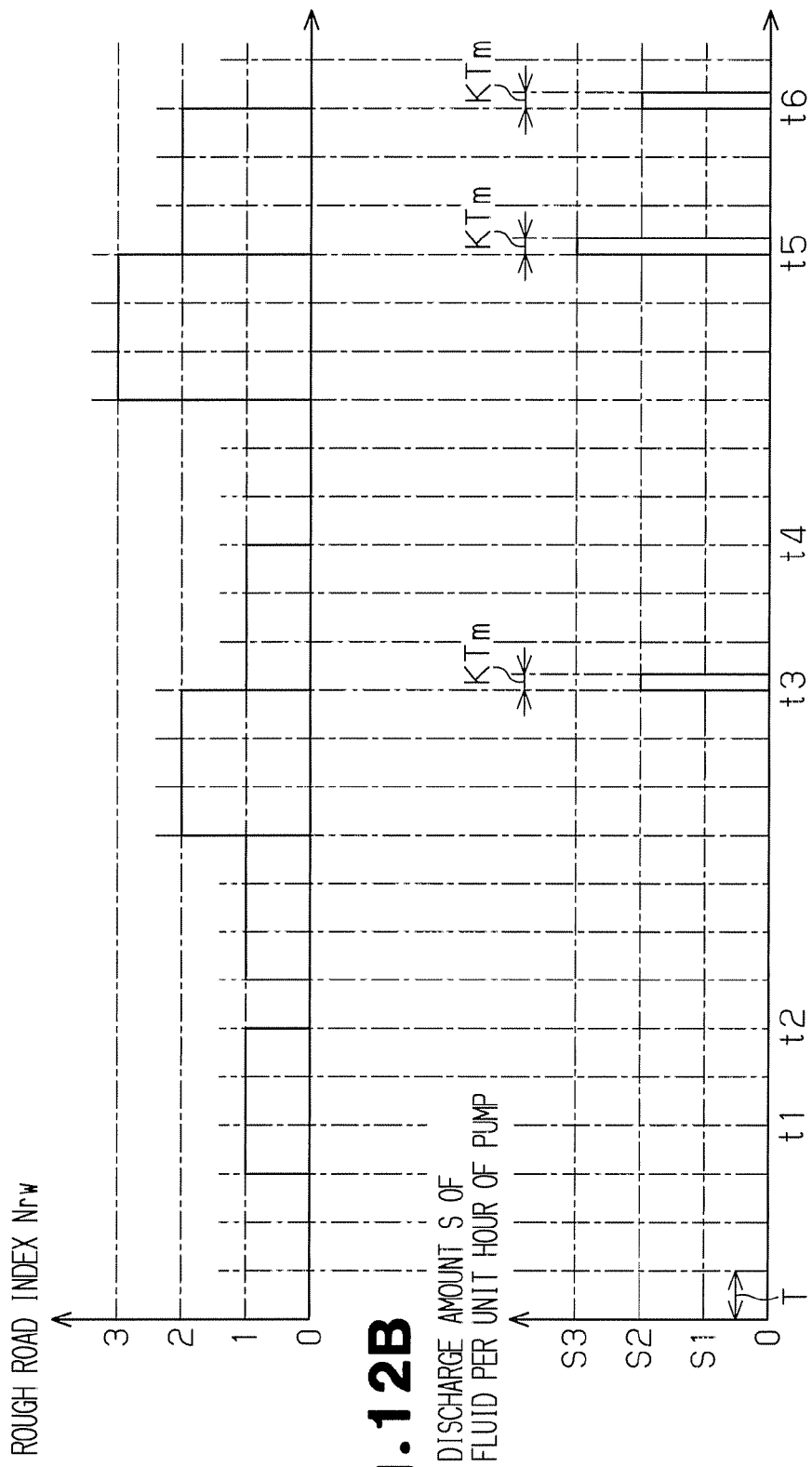
FIGS. 12A and 12B are timing charts illustrating a timing in which a brake force is provided to the wheel in the second embodiment.

Next, the brake control method of the vehicle in the second embodiment will be described by using the timing charts illustrated in FIGS. 12A and 12B. In FIGS. 12A and 12B, a predetermined period T is illustrated slightly longer for facilitating understanding the description of the specification, although the predetermined period T is basically much shorter than the threshold value KTm.

As illustrated in FIG. 12, during the travel of the vehicle, the rough road index Nrw of the road on which the vehicle travels is calculated in a predetermined cycle T. A the next period of the first timing t1 in which the rough road index Nrw is "1", i.e., in the second timing t2 in which the rough road index Nrw is "0", is "1", the brake control to reduce or eliminate the inclination of the brake rotor 50 is not executed even if the lowering of the rough road index Nrw is detected because the previous rough road index Nrw_b, or the rough road index at the first timing t1), is "1".

After that, the rough road index Nrw of the road on which the vehicle travels becomes large in stages. In the third timing t3 in which the rough road index Nrw decreases from "2" to "1", since the previous rough road index Nrw_b was "2", the brake control to reduce or eliminate the inclination of the brake rotor 50 is executed only for the period of the threshold value KTm. That is, since the previous rough road index Nrw_b was "2", each pump 41 and 42 in the brake device 13 is driven such that each discharge amount S of the brake fluid per unit hour becomes a second discharge amount S2. As a result, even if the brake rotor 50 inclines to the brake pads 51 and 52 based on the travel on the road having the rough road index Nrw of "2", the inclination is reduced or eliminated. After that, when the rough road index Nrw decreases from "1" to "0", the brake control is not executed (in the fourth timing t4).

In a fifth timing t5 in which the rough road index Nrw becomes "2" after the vehicle travels on the road having the rough road index Nrw of "3", since the previous rough road index Nrw_b was "3", the brake control to reduce or eliminate the inclination of the brake rotor 50 is executed only for the period of threshold value KTm. That is, each pump 41 and 42 in the brake device 13 is driven such that each discharge amount S of the brake fluid per unit hour becomes a third discharge amount S3. As a result, even if the brake rotor 50 inclines to the brake pads 51 and 52 based on the travel on the road having the rough road index Nrw of "2", the inclination is temporarily reduced or eliminated. After that, the vehicle travels on the road having the rough road index Nrw of "2", so that, even if the brake rotor 50 inclines to the brake pads 51 and 52, the inclination degree of the brake rotor 50 is small as compared with the inclination degree before the brake control is executed at the fifth timing t5.

After that, when the rough road index Nrw is reduced from "2" to "0", the brake device 13 is driven in the drive mode in which the rough road index Nrw is "2". As a result, the inclination of the brake motor 50 is suitably reduced or eliminated (in the sixth timing t6).

The second embodiment has the following advantages in addition to the advantages (2) and (5) to (8) of the first embodiment as described above.

(9) Every time the rough road index Nrw becomes small, the brake pads 51 and 52 approach the brake rotor 50. As a result, even when the brake rotor 50 inclines to the brake pads 51 and 52 by the reaction force received by the wheels from the rough road during the travel of the vehicle thereon, the inclination of the brake rotor 50 is periodically reduced to some extent. Moreover, the brake device 13 does not necessarily continue to drive during the travel of the vehicle on the rough road. Accordingly, the total power consumption of the brake device 13 is reduced as compared with the case where the brake device 13 continues to drive during the travel of the vehicle on the rough road. Consequently, not only the increase in the total power consumption of the brake device 13 is suppressed but also the occurrence of the uneven wear of the brake rotor 50 and the brake pads 51 and 52 can be suppressed.

(10) In general, the reaction force which the wheels FR, FL, RR, and RL receive from the road surface becomes larger as the rough road index Nrw becomes larger. The inclination degree of the brake rotor 50 to the brake pads 51 and 52 also becomes larger. That is, the moving amount of the brake pad 51 in the direction to be away from the brake rotor 50 also becomes large. In this regard, in the second embodiment, the flow rate of the brake fluid per unit hour into the wheel cylinders 28a to 28d becomes larger as the previous rough road index Nrw_b becomes larger. Thus, the driving force provided to the brake pad 51 is made large. As a result the brake pads 51 and 52 are securely made contact with the brake rotor 50, and the inclination of the brake rotor 50 can be reduced or eliminated.

(11) When the wheels FR, FL, RR, and RL are provided the braking force before the execution of each processing at the steps S54, S55, and S56 is started after the rough road index Nrw becomes small, the driving of the brake device 13 for reducing or eliminating the inclination of the brake rotor 50 is regulated. Consequently, unnecessary driving of the brake device 13 can be prevented despite of the fact that the inclination of the brake rotor 50 has been already eliminated.

(12) When the decrease in the rough road index Nrw is detected during the period when the vehicle travels or has traveled on the rough road in which the brake rotor 50 inclines to the brake pads 51 and 52, the brake device 13 is driven to reduce or eliminate the inclination of the brake rotor 50. Thus, when the decrease in the rough road index Nrw is detected during the period when the vehicle travels on the rough road (road surface having the rough road index Nrw of "1" in this embodiment) in which the brake rotor 50 does not incline to the brake pads 51 and 52, that is, when the rough road index Nrw changed from "1" to "0", it is determined that the brake rotor 50 is not inclined, and the driving of the brake device 13 is regulated. Consequently, unnecessary driving of the brake device 13 can be prevented, which can contribute to the reduction in the total power consumption of the brake device 13.

Each of the above embodiments may be modified to another embodiment as follows.

In the first embodiment, each processing at steps S41 and S42 may be omitted. Likewise, in the second embodiment, each processing at steps S69 and S70 may be omitted. Even if configured in this manner, since the driving steps (steps S13 to S15 and S54 to S56) are executed in the case where the determination results at steps S40 and S68 are affirmative, the driver's feeling of deceleration based on the execution of the driving steps can be suppressed.

In the first embodiment, each processing at steps S39 and S40 may be omitted. Likewise, in the second embodiment, each processing at steps S67 and S68 may be omitted. That is, regardless of the longitudinal deceleration Gx of the vehicle after the termination of traveling on the rough road, the driving steps can be executed.

In each embodiment, a Yaw Rate of the vehicle may be calculated so that the stability of the behavior of the vehicle is determined using the magnitude of the Yaw Rate. Alternatively, the steering angle of a steering wheel of the vehicle may be calculated so that the stability of the behavior of the vehicle is using the magnitude of the steering angle. Regardless of whether the behavior of the vehicle caused by the turning of the vehicle after termination of the travel on the rough road is stable, the driving steps can be executed.

In the first embodiment, each processing at steps S35 and S36 may be omitted. Likewise, in the second embodiment, each processing at steps S63 and S64 may be omitted. That is, regardless of the vehicle speed VS of the vehicle after the termination of the travel on the rough road, the driving steps can be executed.

In each embodiment, the control to reduce or eliminate the inclination of the brake rotor 50 may be regulated for the wheel (for example, the left rear wheel RL) which is provided the driving force before the driving steps actually start after the start timing of the driving steps (steps S13, S14, S15, S54, S55, and S56), whereas the control to reduce or eliminate the inclination of the brake rotor 50 may be executed for the other wheels (for example, the right front wheel FR, the left front wheel FL, and the right rear wheel RR) which are not provided the braking force.

In the first embodiment, the control to reduce or eliminate the inclination of the brake rotor 50 after the termination of the travel on the rough road may be regulated for the wheel (for example, the left rear wheel RL) which are provided the braking force during the travel on the rough road. When the braking force is provided to at least one wheel during the travel on the rough road, the control to reduce or eliminate the inclination of the brake rotor 50 may be regulated for all the wheels after termination of the travel on the rough road. The mode of regulation may be cancellation of the control, reduction in the vehicle speed, or reduction in the discharge amount S.

In the second embodiment, the determination processing at step S62 may be omitted. When configured in this manner, regardless of the other brake controls or the presence or absence of operation of the brake pedal 11 by the driver, the driving steps are executed when the drive flag FLG1 is set to "1".

In each embodiment, as far as the inclination of the brake rotor 50 is reduced or eliminated, the discharge amount S may be a predetermined amount set in advance, regardless of the magnitude of the rough road index maximum value Nrw_max or the magnitude of the previous rough road index Nrw_b during the travel on the rough road. When configured in this manner, the control load of the ECU 14 can be reduced as compared with the first and second embodiments. The predetermined amount is desirably set to the discharge amount capable of making each brake pad 51 and 52 slide on the brake rotor 50 even when traveling on the road surface having the rough road index Nrw of "3" (that is, the maximum).

In each embodiment, as far as the inclination of the brake rotor 50 is reduced or eliminated, the discharge amount S may be any amount if it is capable of making the inclination degree of the brake rotor 50 small even if only slightly.

In each embodiment, the rough road index Nrw of the road surface was classified into four stages from "0" to "3". However, the rough road index Nrw may be more finely classified (into, for example, 50 stages) according to the unevenness degree of the road surface. In this case, the discharge amount S is desirably set to become larger as the rough road index maximum value Nrw_max or the previous rough road index Nrw_b during the travel on the rough road becomes larger.

In each embodiment, the rough road index Nrw may be calculated based not on the wheel acceleration DVW of the wheels FR, FL, RR, and RL, but on the longitudinal deceleration Gx of the vehicle. When the vehicle is provided with a sensor for calculating the vertical acceleration, the rough road index Nrw may be calculated based on the vertical acceleration of the vehicle based on the signal from the sensor.

In each embodiment, the control to reduce or eliminate the inclination of the brake rotor 50 may be executed only for the front wheels FR and FL.

The control to reduce or eliminate the inclination of the brake rotor 50 may be individually executed every wheel FR, FL, RR, and RL.

In each embodiment, the threshold value KTm used for step S14 or step S15 may be changed according to the magnitude of the rough road index maximum value Nrw_max during the travel on the rough road or the magnitude of the previous rough road index Nrw_b.

In each embodiment, for the control to reduce or eliminate the inclination of the brake rotor 50, not only the motor M, but also the proportional solenoid valves 24 and 25, the first solenoid valves 31 to 34, and the second solenoid valves 35 to 38 may be driven. In this case, even if the driving mode of the motor M is not changed, the flow rate of the brake fluid into the wheel cylinders 28a to 28d can be changed.

The control device 13 may be embodied as an electrically operated brake device instead of being embodied as a hydraulic control device.

Figure 6:
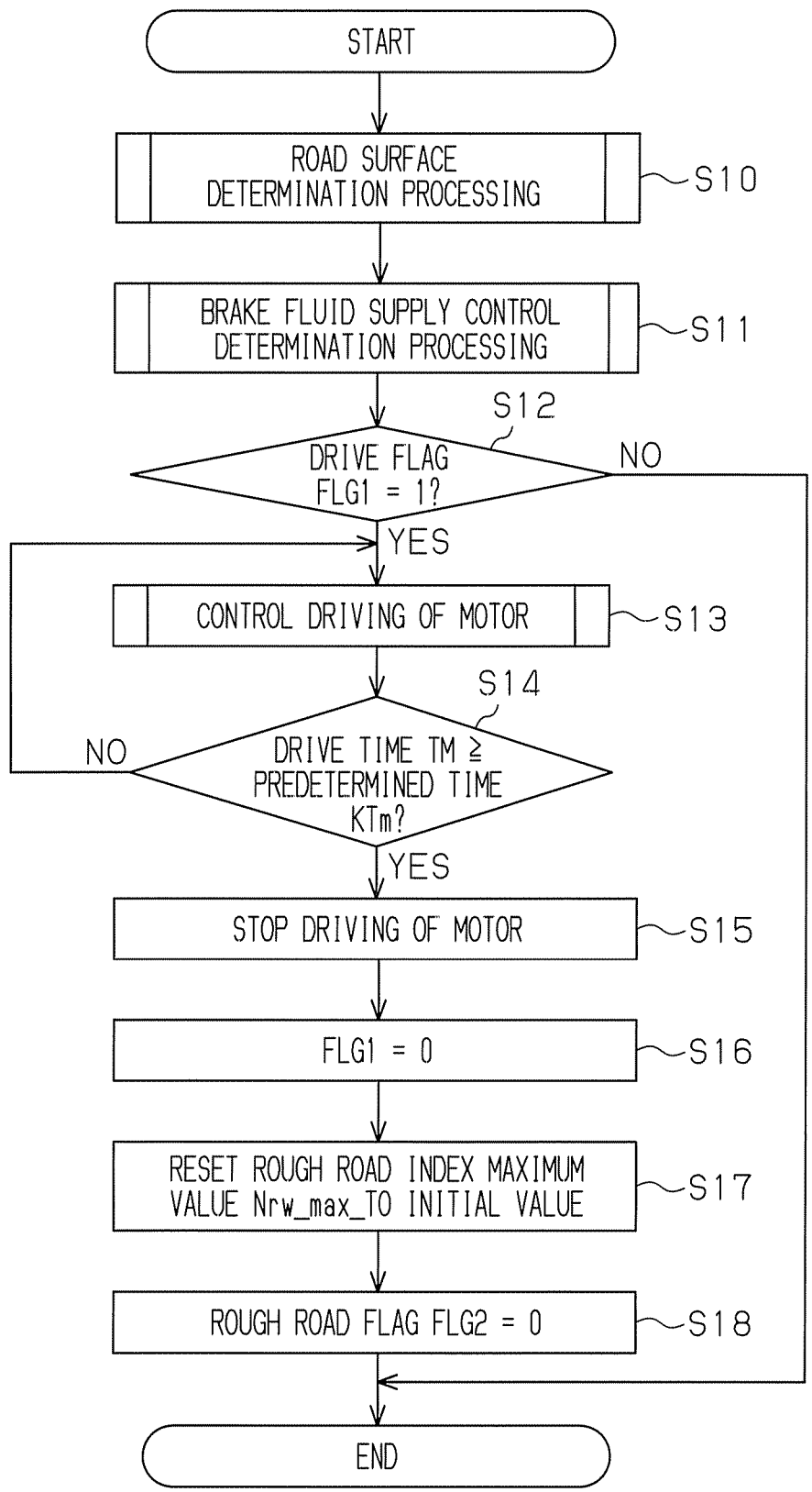
FIG. 6 is a flowchart explaining brake fluid supply control routine according to the first embodiment.
Figure 13:
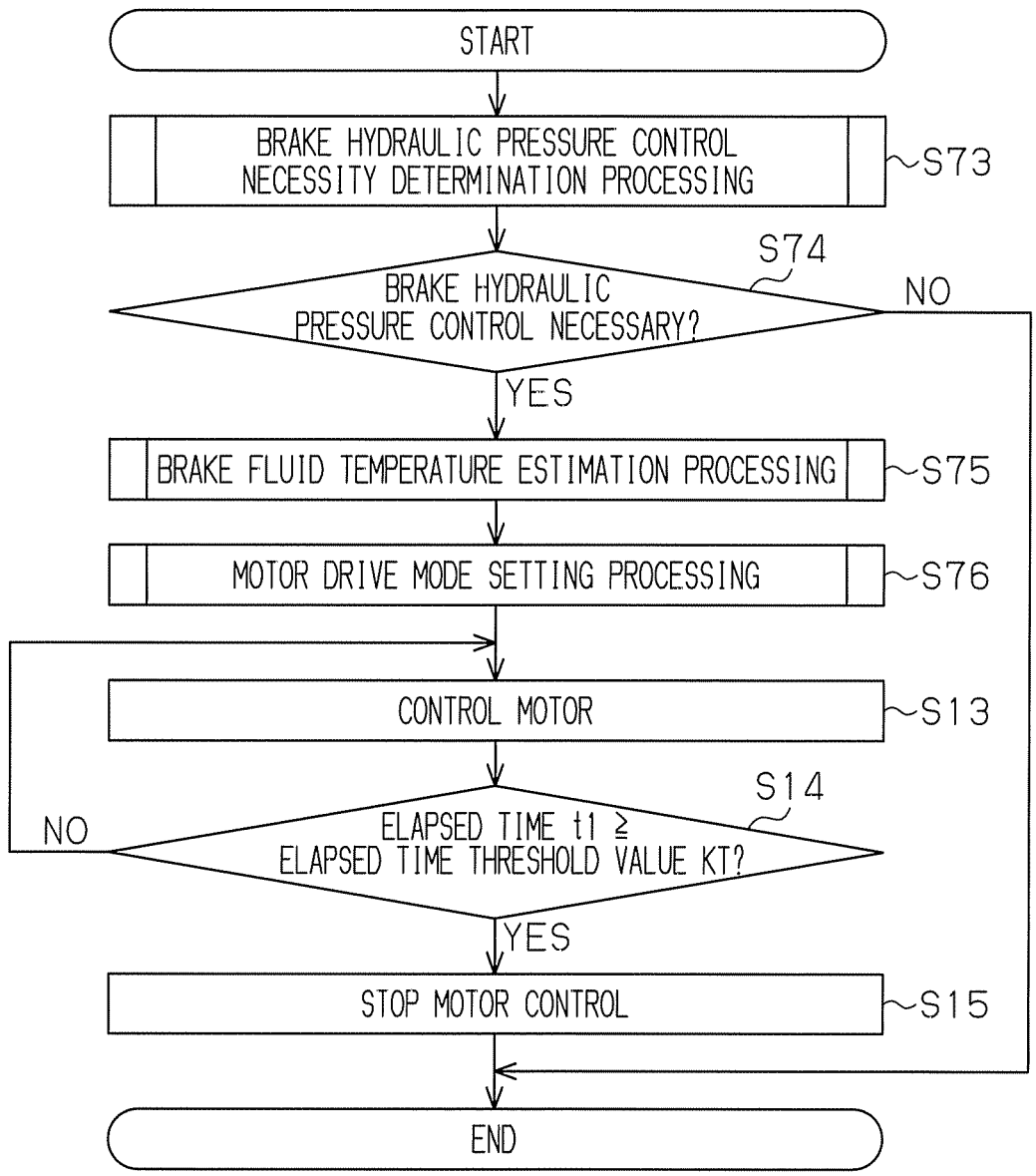
FIG. 13 is a flowchart explaining the brake fluid supply control routine.

As illustrated in FIG. 13 which is a modified example of FIG. 6, the brake fluid supply control routine may further include brake hydraulic pressure control necessity determination processing S73, brake hydraulic pressure control determination processing S74, brake fluid temperature estimation processing S75, and motor driving mode setting processing S76 in addition to brake fluid supply control determination processing S11 or instead at step S11 and S12.

Figure 14:
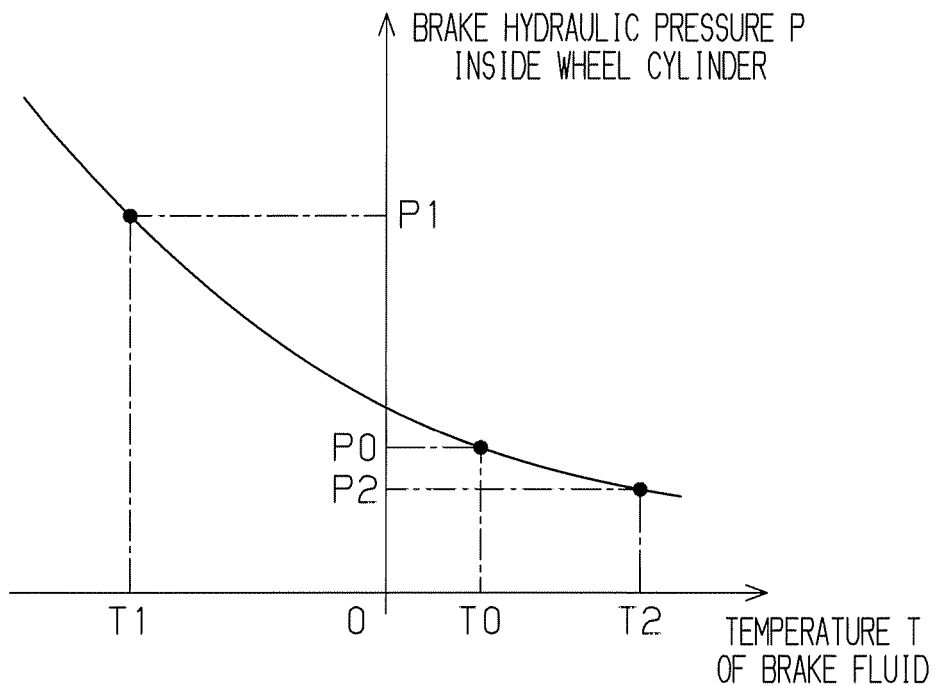
FIG. 14 is a map representing the relationship between the temperature of brake fluid and brake hydraulic pressure P inside a wheel cylinder.

Specifically, FIG. 14 is a map stored in the ROM 56. The map is a map for estimating the brake hydraulic pressure P that can be generated inside the wheel cylinders 28a to 28d when the motor M is driven such that the discharge amount S of the brake fluid per unit hour of the pumps 41 and 42 becomes a reference discharge amount B (see FIG. 15). The map shows the relationship between the temperature T of the brake fluid in the case and the brake hydraulic pressure P inside the wheel cylinders 28a to 28d where the brake hydraulic pressure control processing is not executed. Specifically, when the driving of the motor M is controlled such that the discharge amount S becomes the reference discharge amount B, the brake hydraulic pressure P inside the wheel cylinders 28a to 28d becomes lower as the temperature T of the brake fluid inside the hydraulic pressure circuits 18 and 19 is higher. For example, the brake hydraulic pressure P when the temperature T of the brake fluid is a first temperature T1 (for example, "−30° C.") becomes a first brake pressure P1, which is higher than the reference brake hydraulic pressure P0 (for example, "0.15 MPa") when the temperature T of the brake fluid is a reference temperature T0 (for example, "20° C."). On the other hand, the brake hydraulic pressure P when the temperature T of the brake fluid is a second temperature T2 (for example, "40° C.") becomes a second brake hydraulic pressure P2, which is lower than the reference brake hydraulic pressure PO. In the present embodiment, the "reference discharge amount B" refers to a discharge amount such that the brake hydraulic pressure P inside each cylinder 28a to 28d becomes the reference brake pressure P0 when the temperature T of the brake fluid is the reference temperature T0.

As described above, the ECU 14 executes the brake fluid supply control routine in a predetermined cycle (for example, every "0.01 sec"). In this brake fluid supply control routine, the ECU 14 executes the brake hydraulic pressure control necessity determination processing (step S73). That is, when the vehicle travels on the rough road paved with gravels or the like (also referred to as "off road") and when the vehicle turns, the brake rotor 50 may incline to each brake pad 51 and 52 because the wheels FR, FL, RR, and RL receive a large reaction force from the road surface. Moreover, when the driver frequently performed stepping operations of the brake pedal, the temperature of the brake rotor excessively increases, and each sliding contact surface 50a and 50b of the brake rotor 50 may incline (also referred to as "thermal buckling"). In such cases, the size of two clearances C between the brake rotor 50 and each brake pad 51 and 52 is changed to be different from each other, whereby the uneven wear of the brake pads 51 and 52 or the brake judder may be generated. Thus, when the sliding contact surfaces 50a and 50b of the brake rotor 50 incline, reduction or elimination of such inclination is desired. Thus, at step S73, size d1 of the clearance C between the brake rotor 50 and each brake pad 51 and 52 is estimated from the travel state of the vehicle (for example, degree of roughness on the road surface on which the vehicle travels).

The ECU 14 determines the necessity of the brake hydraulic pressure control caused by the change in the size d1 of the clearance C between the brake rotor 50 and each brake pad 51 and 52 (step S74). If this determination result is negative, the ECU 14 determines that the sliding contact surfaces 50a and 50b of the brake rotor 50 are not inclined, and terminates the brake fluid supply control determination routine. On the other hand, if the determination result at step S47 is affirmative, the ECU 14 determines that the sliding contact surfaces 50a and 50b of the brake rotor 50 are inclined, and executes the brake fluid temperature estimation processing for estimating the temperature T of the brake fluid inside each hydraulic pressure circuits 18 and 19 (step S75).

Specifically, the ECU 14 calculates and detects the external temperature of the vehicle based on the input signal from an external temperature sensor SE8. Then the ECU 14 estimates that the external temperature and the temperature of the set atmosphere of the brake device 13 (or the hydraulic pressure circuits 18 and 19) inside the vehicle are at the same level, and sets the external temperature as the temperature T of the brake fluid. That is, at step S75, the temperatures T of the brake fluid inside the hydraulic pressure circuits 18 and 19 are detected. In this regard, the ECU 14 also functions as a fluid temperature detecting section. Step S75 corresponds to the fluid temperature detection step.

Figure 15:
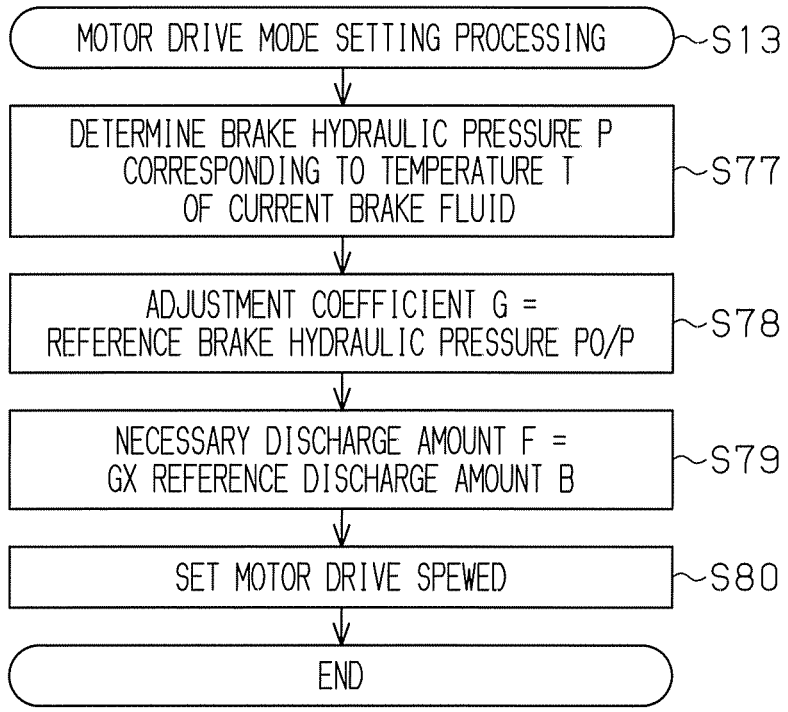
FIG. 15 is a flowchart explaining motor drive mode setting routine.

Subsequently, the ECU 14 performs motor drive mode setting processing, which will be described in detail with respect to FIG. 15, for setting the drive mode of the motor M, which is a drive source of each pump 41 and 42 (step S76). Then, the ECU 14 controls the drive of the Moro M based on the drive mode set at step S76 (step S13). Subsequently, the ECU 14 determines whether the drive time Tm, which is the elapsed time from starting the drive of the motor M, is equal to or more than the threshold value KTm set in advance (for example, two seconds) (step S14).

If the determination result at step S14 is negative (Tm<KTm), the ECU 14 repeats each processing at steps S13 and S14 until the determination result at step S14 becomes affirmative. If the determination result at step S14 is affirmative (Tm≥KTm), the ECU 14 stops the drive of the motor M (step S15). After that, the ECU 14 terminates the brake hydraulic pressure control processing routine.

The motor drive mode setting routine at the step S76 will be described based on the flow chart illustrated in FIG. 15. In the motor drive mode setting routine, the ECU 14 reads out a brake hydraulic pressure P (for example, a first brake hydraulic pressure P1) corresponding to the temperature T (for example, a first temperature T1) of the current brake fluid from the map of FIG. 14 (step S77). Then, the ECU 14 divides the reference brake hydraulic pressure PO by the brake hydraulic pressure P (for example, the first brake hydraulic pressure P1) read out at step S77, and calculates an adjustment coefficient G (step S78).

The ECU 14 integrates the adjustment coefficient G calculated at step S78 with the reference discharge amount B to calculate a necessary discharge amount F (step S79). Subsequently, the ECU 14 sets the drive mode of the motor M such that the discharge amount S per unit hour of the pumps 41 and 42 becomes the necessary discharge amount F calculated at step S79 (step S80), and then terminates the motor drive mode setting routine. That is, the drive mode of the motor M is set such that the discharge speed of the brake fluid from the pumps 41 and 42 is made faster as the temperature T of the brake fluid inside the hydraulic pressure circuits 18 and 19 is high. Information such as the threshold value KTm, the reference brake hydraulic pressure PO, and the reference discharge rage B is stored in the ROM 56, and the information such as the temperature of the brake fluid, the brake hydraulic pressure P, the adjustment coefficient G, and the necessary discharge amount F is re-written as appropriate, and is stored in the RAM 57.

Next, the hydraulic pressure control method in this modified example will be described.

For example, when the temperature T of the brake fluid is the first temperature T1, a pressure loss when the brake fluid passes inside the proportional solenoid valves 24 and 25 becomes greater as compared with the case where the temperature T of the brake fluid is the reference temperature T0. This is because the viscosity coefficient of the brake fluid becomes higher in the case where the temperature T is T1 as compared with the case becomes greater than the case where the temperature T is T0. That is, the brake fluid discharged from the pumps 41 and 42 is hard to flow to the master cylinder 17 through inside the proportional solenoid valves 24 and 25. Thus, a ratio of the brake fluid flowing into the wheel cylinders 28a to 28d from among the brake fluid discharged from the pumps 41 and 42 becomes higher as the temperature T of the brake fluid becomes lower (See FIG. 14).

Thus, when the temperature T of the brake fluid is low, the drive of the pumps 41 and 42 is controlled such that the discharge amount S of the brake fluid per unit hour of the pumps 41 and 42 becomes smaller than in the case where the temperature T of the brake fluid is the reference temperature T0. Specifically, the number of rotations of the motor M is controlled to be small. As a result, the increase in the flow rate of the brake fluid flowing inside the wheel cylinder 28*a* to 28*d* is suppressed, and the brake hydraulic pressure P inside the wheel cylinders 28*a* to 28*d* is maintained to the reference brake hydraulic pressure P0. Consequently, the increase in the braking force for each wheel FR, FL, RR, and RL is suppressed, and an unnecessary feeling of deceleration or a feeling of drag, provided to the driver is suppressed.

Meanwhile, when the temperature T of the brake fluid is the second temperature T2, a pressure loss when the brake fluid passes inside the proportional solenoid valves 24 and 25 becomes less as compared with the case where the temperature T is the reference temperature T0. This is because the viscosity coefficient of the brake fluid becomes lower in the case where the temperature T is T1 as compared with the case where the temperature T is temperature T0. That is, the brake fluid discharged from the pumps 41 and 42 is easy to flow to the master cylinder 17 through inside the proportional solenoid valves 24 and 25. Thus, a ratio of the brake fluid flowing into the wheel cylinders 28*a* to 28*d* from among the brake fluid discharged from the pumps 41 and 42 becomes lower as the temperature T of the brake fluid becomes high (see FIG. 14).

Thus, when the temperature T of the brake fluid is high, the drive of the motor M is controlled such that the discharge amount S of the brake fluid per unit hour of the pumps 41 and 42 becomes greater than in the case where the temperature T of the brake fluid is the reference temperature T0. As a result, the flow rate of the brake fluid flowing inside the wheel cylinders 28*a* to 28*d* is increased, and the brake hydraulic pressure P inside the wheel cylinders 28*a* to 28*d* is maintained to the reference brake hydraulic pressure P0. Consequently, by sliding each brake pad 51 and 52 on the brake rotor 50 securely, the inclination of the brake rotor 50 is suitably reduced or eliminated.

In this manner, by the detection of the temperature T of the brake fluid based on the signal from the external temperature sensor SE8, the discharge amount S per unit hour of the pumps 41 and 42 may be controlled, whereby the change in the brake hydraulic pressure P inside the wheel cylinders 28*a* to 28*d* caused by the change in the temperature T of the brake fluid can be suppressed.

The temperature T of the brake fluid may be detected based on the temperature of the air sucked in the vehicle engine. Alternatively, the temperature T of the brake fluid may be calculated by using compensation value of the input signal of one or plural temperature sensors received from various types of ECUs mounted on the vehicle such as an engine ECU that controls the drive of the engine and an air conditioner ECU that controls the drive of the air conditioner for adjusting the room temperature. Further, the temperature T of the brake fluid may be the detection result based on the input signal from the external air temperature sensor SE8 compensated based on the drive mode of the brake device 13 before the brake hydraulic pressure control is performed. The temperature sensor for detecting the temperature T of the brake fluid may be provided in each hydraulic pressure circuits 18 and 19.

The present examples and embodiments are to be considered as illustrative and not restrictive and the invention is not to be limited to details give herein, but may be modified within the scope and equivalence of the appended claims.

What is claimed is:

1. A brake controller for a vehicle, wherein the vehicle includes a brake rotor integrally rotating with a wheel, a brake pad capable of moving in directions to approach and move away from the brake rotor, and a brake device for providing a driving force to the brake pad in order to make the brake pad approach the brake rotor, wherein the brake controller is mounted on the vehicle to control the driving of the brake device, the brake controller comprising:

a rough road index calculating section for calculating a rough road index in a predetermined cycle, wherein the rough road index indicates an unevenness degree of the road on which the vehicle travels; and a controlling section for controlling the driving of the brake device to provide the driving force to the brake pad for a predetermined time when the rough road index calculated by the rough road index calculating section is changed from a value equal to or greater than a threshold value to a value less than the threshold value, wherein the threshold value is a predetermined value as a reference value to determine whether the road is a rough road in which the road surface has relatively large degree of unevenness or a smooth road in which the road surface has relatively small degree of unevenness, wherein the rough road index calculating section updates and stores a maximum value of the rough road index during travel of the vehicle on the rough road, wherein the controlling section controls the driving of the brake device so that the driving force provided to the brake pad becomes larger as the currently stored maximum value of the rough road index becomes larger when the rough road index calculated by the rough road index calculating section is changed from the value equal to or greater than the threshold value to the value less than the threshold value.

2. The brake controller according to claim 1, further comprising a vehicle speed calculating section for calculating vehicle speed of the vehicle, wherein the controlling section controls the driving of the brake device to provide the driving force to the brake pad when the vehicle speed calculated by the vehicle speed calculating section is equal to or more than a predetermined vehicle speed threshold value and when the rough road index is changed from the value equal to or greater than the threshold value to the value less than the threshold value.

3. The brake controller according to claim 1, further comprising an acceleration calculating section for calculating lateral acceleration of the vehicle, wherein the controlling section controls the driving of the brake device to provide the driving force to the brake pad when lateral acceleration calculated by the acceleration calculating section is equal to or less than a predetermined acceleration threshold value and when the rough road index is changed from the value equal to or greater than the threshold value to the value less than the threshold value.

4. The brake controller according to claim 1, further comprising a deceleration calculating section for calculating deceleration in the traveling direction of the vehicle, wherein the controlling section controls the driving of the brake device to provide the driving force to the brake pad when deceleration in the traveling direction calculated by the deceleration calculating section is equal to or less than a predetermined deceleration threshold value and when the rough road index is changed from the value equal to or greater than the threshold value to the value less than the threshold value.

5. The brake controller according to claim 1, wherein the controlling section controls the driving of the brake device to provide the driving force to the brake pad when it is detected that an acceleration pedal for accelerating the vehicle is being operated and when the rough road index is changed from the value equal to or greater than the threshold value to the value less than the threshold value.

6. The brake controller according to claim 1, wherein the controlling section does not perform the driving of the brake device when a braking force is provided to the wheel based on the operation of a brake pedal by a vehicle driver during the travel of the vehicle on the rough road.

7. The brake controller according to claim 6, further comprising:
   a vehicle speed calculating section for calculating vehicle speed of the vehicle;
   an acceleration calculating section for calculating lateral acceleration of the vehicle; and
   a deceleration calculating section for calculating deceleration in the traveling direction of the vehicle;
   wherein the controlling section controls the driving of the brake device to provide the driving force to the brake pad when the vehicle speed calculated by the vehicle speed calculating section is equal to or more than a predetermined vehicle speed threshold value and when the rough road index is changed from the value equal to or greater than the threshold value to the value less than the threshold value;
   wherein the controlling section controls the driving of the brake device to provide the driving force to the brake pad when lateral acceleration calculated by the acceleration calculating section is equal to or less than a predetermined acceleration threshold value and when the rough road index is changed from the value equal to or greater than the threshold value to the value less than the threshold value;
   wherein the controlling section controls the driving of the brake device to provide the driving force to the brake pad when deceleration in the traveling direction calculated by the deceleration calculating section is equal to or less than a predetermined deceleration threshold value and when the rough road index is changed from the value equal to or greater than the threshold value to the value less than the threshold value; and
   wherein the controlling section controls the driving of the brake device to provide the driving force to the brake pad when it is detected that an acceleration pedal for accelerating the vehicle is being operated and when the rough road index is changed from the value equal to or greater than the threshold value to the value less than the threshold value.

8. The brake controller according to claim 6, further comprising:
   a vehicle speed calculating section for calculating vehicle speed of the vehicle;
   an acceleration calculating section for calculating lateral acceleration of the vehicle; and
   a deceleration calculating section for calculating deceleration in the traveling direction of the vehicle;
   wherein the controlling section controls the driving of the brake device to provide a predetermined driving force to the brake pad so that the brake pad contacts the brake rotor when the rough road index is changed from the value equal to or greater than the threshold value to the value less than the threshold value;
   wherein the controlling section controls the driving of the brake device to provide the driving force to the brake pad when the vehicle speed calculated by the vehicle speed calculating section is equal to or more than a predetermined vehicle speed threshold value and when the rough road index is changed from the value equal to or greater than the threshold value to the value less than the threshold value;
   wherein the controlling section controls the driving of the brake device to provide the driving force to the brake pad when lateral acceleration calculated by the acceleration calculating section is equal to or less than a predetermined acceleration threshold value and when the rough road index is changed from the value equal to or greater than the threshold value to the value less than the threshold value;
   wherein the controlling section controls the driving of the brake device to provide the driving force to the brake pad when deceleration in the traveling direction calculated by the deceleration calculating section is equal to or less than a predetermined deceleration threshold value and when the rough road index is changed from the value equal to or greater than the threshold value to the value less than the threshold value; and
   wherein the controlling section controls the driving of the brake device to provide the driving force to the brake pad when it is detected that an acceleration pedal for accelerating the vehicle is being operated and when the rough road index is changed from the value equal to or greater than the threshold value to the value less than the threshold value.

9. The brake controller according to claim 1, further comprising:
   a vehicle speed calculating section for calculating vehicle speed of the vehicle;
   an acceleration calculating section for calculating lateral acceleration of the vehicle; and
   a deceleration calculating section for calculating deceleration in the traveling direction of the vehicle;
   wherein the controlling section controls the driving of the brake device to provide the driving force to the brake pad when the vehicle speed calculated by the vehicle speed calculating section is equal to or more than a predetermined vehicle speed threshold value and when the rough road index is changed from the value equal to or greater than the threshold value to the value less than the threshold value;
   wherein the controlling section controls the driving of the brake device to provide the driving force to the brake pad when lateral acceleration calculated by the acceleration calculating section is equal to or less than a predetermined acceleration threshold value and when the rough road index is changed from the value equal to or greater than the threshold value to the value less than the threshold value;
   wherein the controlling section controls the driving of the brake device to provide the driving force to the brake pad when deceleration in the traveling direction calculated by the deceleration calculating section is equal to or less than a predetermined deceleration threshold value and when the rough road index is changed from the value equal to or greater than the threshold value to the value less than the threshold value; and
   wherein the controlling section controls the driving of the brake device to provide the driving force to the brake pad when it is detected that an acceleration pedal for accelerating the vehicle is being operated and when the rough road index is changed from the value equal to or greater than the threshold value to the value less than the threshold value.

10. A brake control method for a vehicle, wherein the vehicle includes a brake rotor integrally rotating with a wheel, a brake pad capable of moving in directions to approach and move away from the brake rotor, and a brake device for providing a driving force to the brake pad in order to make the brake pad approach the brake rotor, wherein the method controls the brake device to move the brake pad in a direction to approach the brake rotor, the method comprising:

calculating the rough road index in a predetermined cycle, wherein the rough road index indicates an unevenness degree of the road on which the vehicle travels;

driving the brake device to provide the driving force to the brake pad for a predetermined time so that the brake pad approaches the brake rotor when the rough road index calculated by the calculating step is changed from a value equal to or greater than a threshold value to a value less than the threshold value, wherein the threshold value is a predetermined value as a reference value to determine whether the road is a rough road in which the road surface has relatively large degree of unevenness or a smooth road in which the road surface has relatively small degree of unevenness;

updating and storing a maximum value of the rough road index during travel of the vehicle on the rough road; and controlling the driving of the brake device so that the driving force provided to the brake pad becomes larger as the currently stored maximum value of the rough road index becomes larger when the rough road index calculated by the calculating step is changed from the value equal to or greater than the threshold value to the value less than the threshold value.

* * * * *